United States Patent
Kumawat et al.

(10) Patent No.: US 11,443,156 B2
(45) Date of Patent: Sep. 13, 2022

(54) METHODS AND SYSTEMS FOR DISPLAYING HEALTH STATUS OF A PAYMENT CARD

(71) Applicant: MASTERCARD INTERNATIONAL INCORPORATED, Purchase, NY (US)

(72) Inventors: Jaipal Singh Kumawat, Sikar (IN); Sandeep Parvathareddy, Guntur (IN); Chandan Garg, Gurgaon (IN); Ajay Panwar, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/371,674

(22) Filed: Jul. 9, 2021

(65) Prior Publication Data

US 2022/0012557 A1    Jan. 13, 2022

(30) Foreign Application Priority Data

Jul. 10, 2020    (IN) .............................. 202041029334

(51) Int. Cl.
*G06K 19/077*    (2006.01)
*G06Q 20/40*    (2012.01)
*G06Q 20/10*    (2012.01)

(52) U.S. Cl.
CPC ..... *G06K 19/07707* (2013.01); *G06Q 20/105* (2013.01); *G06Q 20/409* (2013.01)

(58) Field of Classification Search
CPC ........... G06K 19/07707; G06Q 20/105; G06Q 20/409; G06Q 20/204; G06Q 20/341; G06Q 20/354; G06Q 20/3563; G07F 7/082; G07F 7/0846; G07F 7/084
See application file for complete search history.

(56) References Cited

U.S. PATENT DOCUMENTS

| | | | |
|---|---|---|---|
| 5,440,108 A | 8/1995 | Tran et al. | |
| 7,497,371 B1 * | 3/2009 | Sparks | G06Q 20/18 235/379 |
| 8,201,747 B2 | 6/2012 | Brown et al. | |
| 9,275,386 B2 | 3/2016 | Olson et al. | |
| 9,661,012 B2 | 5/2017 | Michel et al. | |
| 10,417,626 B1 | 9/2019 | Locke et al. | |
| 2007/0018003 A1 * | 1/2007 | Jeong | G06K 19/073 235/492 |

(Continued)

FOREIGN PATENT DOCUMENTS

EP    0929053 A1    7/1999

*Primary Examiner* — Sonji N Johnson
(74) *Attorney, Agent, or Firm* — Talem IP Law, LLP

(57) ABSTRACT

Embodiments provide methods and systems for determining and displaying health status of a payment card. The payment card includes a planar body, an interconnection circuit, and a display section. The planar body houses a payment card processing section. The interconnection circuit is configured within the planar body. The interconnection circuit is configured to generate a damage signal in response to a physical damage of at least a portion of the planar body or the payment card processing section. The display section is positioned in the planar body for displaying a visual information indicating health status of the payment card in response to the damage signal for a cardholder.

18 Claims, 20 Drawing Sheets

(56) References Cited

U.S. PATENT DOCUMENTS

2008/0071681 A1    3/2008  Khalid
2017/0278109 A1*  9/2017  Naccache ............ G06Q 20/409
2017/0300799 A1*  10/2017  Breed ................ G06K 19/0718

* cited by examiner

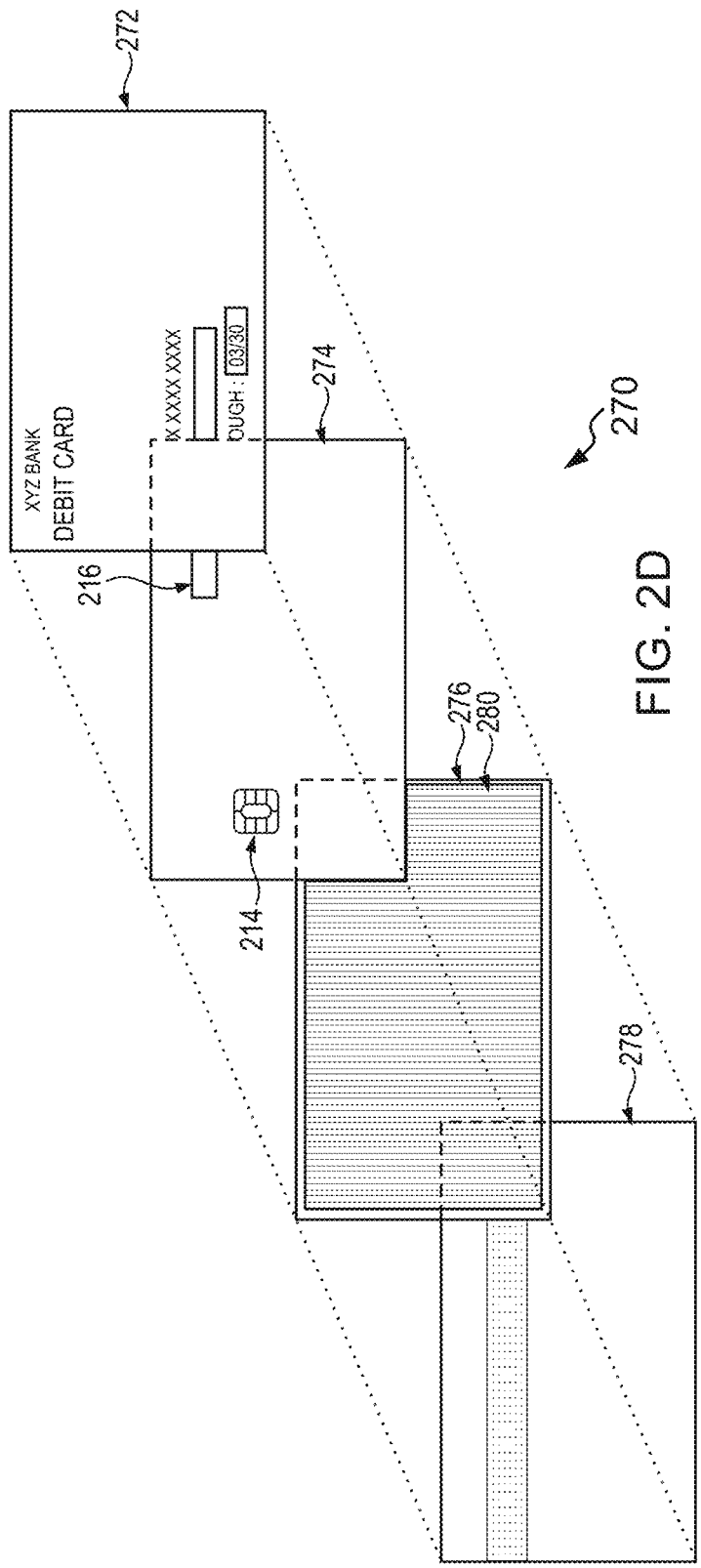

| CARDHOLDER ID 702 | CARDHOLDER NAME 704 | PAYMENT CARD NUMBER 706 | VALIDITY INFORMATION 708 | PAYMENT CARD USAGE INFORMATION 710 ||| |
|---|---|---|---|---|---|---|
| | | | | TERMINAL ID 712 | TRANSACTION NUMBER 714 | HEALTH STATUS 716 |
| F25/15 | DAVE | 1234 XXXX XXXX 5678 | NOV 2020 | MC 11 | ABXXX10 | GOOD |
| | | | | MC 06 | AZXXX09 | GOOD |
| | | | | . | . | . |
| | | | | . | . | . |
| | | | | MC 22 | BFXXX41 | POOR |
| . | . | . | . | . | . | . |
| . | . | . | . | . | . | . |

FIG. 7A

| CARDHOLDER ID 752 | CARDHOLDER NAME 754 | PAYMENT CARD NUMBER 756 | VALIDITY INFORMATION 758 | PAYMENT CARD USAGE INFORMATION 760 | | | VALIDITY EXTENSION INFORMATION 762 |
|---|---|---|---|---|---|---|---|
| | | | | TRANSACTION DATE 764 | TRANSACTION NUMBER 766 | HEALTH STATUS 768 | |
| F25/15 | DAVE | 1234 XXXX XXXX 5678 | NOV 2020 | 2/7/20<br>3/18/20<br>4/12/20<br>7/13/20<br>10/23/20<br>12/25/20 | Ab0003<br>BF01532<br>MZ8235<br>DE4269<br>AY0012<br>BZ1592 | GOOD<br>GOOD<br>GOOD<br>GOOD<br>GOOD<br>GOOD | MAY 2021 |
| . . . . | . . . . | . . . . | . . . . | . . . . | . . . . | . . . . | . . . . |

METHODS AND SYSTEMS FOR DISPLAYING HEALTH STATUS OF A PAYMENT CARD

TECHNICAL FIELD

The present disclosure relates to payment technology and, more particularly to, methods and systems for indicating physical health status of a payment card.

BACKGROUND

With the advent of payment cards, consumers increasingly rely on the payment cards for performing transactions at terminals such as, Point-of-Sale (POS) terminals at merchant facilities, and ATM terminals. However, such payment cards are easily prone to physical damage that may happen due to frequent usage of the payment cards at the terminals. Moreover, cardholders usually carry payment cards in their wallets for ease of access while performing transactions at a retail outlet. The payment cards may be damaged by scraping against other articles in the wallet such as coins, keys, or other cards. The scraping may damage edges, dimensions, magnetic stripe, or embedded chip of the payment card thereby rendering the payment card obsolete. However, the cardholder may be unaware that the payment card is damaged and try to use it at a terminal for a transaction. During the transaction, the terminal may not be able to read the payment card and displays a message that the payment card is 'invalid'. The merchant and/or the other people at the retail outlet waiting in a queue may assume that the cardholder is trying to do a fraud transaction. Such a situation may make the cardholder to cancel the purchase at the retail outlet or refrain from transacting at the terminal. In some cases, if the cardholder is in a dire need to perform a transaction at the terminal and if the payment card is not being read by the terminal, it becomes an unpleasant experience for the cardholder. The physical damage to the payment card may not be directly visible to the cardholder and he/she may not be aware to raise a request for a new payment card from an issuer of the payment card.

Alternatively, there are instances where the payment card is intact with no physical damages in the payment card. However, such payment cards may not be usable as validity time period of the payment card may have expired. This poses an additional burden to the issuer to issue a new payment card to the cardholder even though the payment card is intact. The issuer incurs a cost for issuing the payment card and also increases a burden to the environment by disposing plastic cards at frequent intervals in spite of being in good condition.

In view of the above discussion, there exists a need for a cardholder to be aware of the physical condition of the payment card, minimize the loss incurred by issuers for issuing payment cards, and failed transactions due to use of payment cards that are physically damaged.

BRIEF SUMMARY

Various embodiments of the present disclosure provide methods and systems for determining health status of a payment card.

In an embodiment, a payment card is disclosed. The payment card includes a planar body, an interconnection circuit, and a display section. The planar body houses a payment card processing section. The interconnection circuit is configured within the planar body. The interconnection circuit is configured to generate a damage signal in response to a physical damage of at least a portion of the planar body or the payment card processing section. The display section is positioned in the planar body for displaying a visual information indicating health status of the payment card in response to the damage signal for a cardholder.

In another embodiment, a method is disclosed. The method includes receiving, by an electronic circuit, a damage signal in response to a physical damage of at least a portion of a planar body of a payment card or a payment card processing section housed therewith. The method also includes determining, by the electronic circuit, a health status of the payment card based on the damage signal. The method further includes facilitating, by the electronic circuit, display of a visual information indicating the health status of the payment card for a cardholder on a display section positioned in the planar body.

In yet another embodiment, a payment card is disclosed. The payment card includes a planar body, a plurality of interconnection circuits, a damage sensor, an electronic circuit, and a display section. The planar body houses a payment card processing section. The payment card processing section is embodied in at least one portion of one or more portions of the planar body. The plurality of interconnection circuits is configured within the planar body for detecting a physical damage in at least a portion of the planar body. Each interconnection circuit of the plurality of interconnection circuits is configured in one portion of the one or more portions. The damage sensor is configured to sense the physical damage in at least one interconnection circuit of the plurality of interconnection circuits for generating a damage signal. The electronic circuit is configured to receive the damage signal and determine a health status of the payment card. The display section is positioned in the planar body for displaying a visual information indicating the health status of the payment card for a cardholder.

Other aspects and example embodiments are provided in the drawings and the detailed description that follows.

BRIEF DESCRIPTION OF THE DRAWINGS

For a more complete understanding of example embodiments of the present technology, reference is now made to the following descriptions taken in connection with the accompanying drawings in which:

FIG. 2D illustrates a schematic representation of different layers in a planar body of the payment card of FIG. 2B, in accordance with an example embodiment;

FIG. 7A illustrates a simplified representation of a table storing usage characteristics of the payment card associated with a cardholder, in accordance with an example embodiment of the present disclosure;

FIG. 7B illustrates a simplified representation of a table storing usage characteristics and validity information of the payment card associated with the cardholder, in accordance with an example embodiment of the present disclosure;

Figure 1:
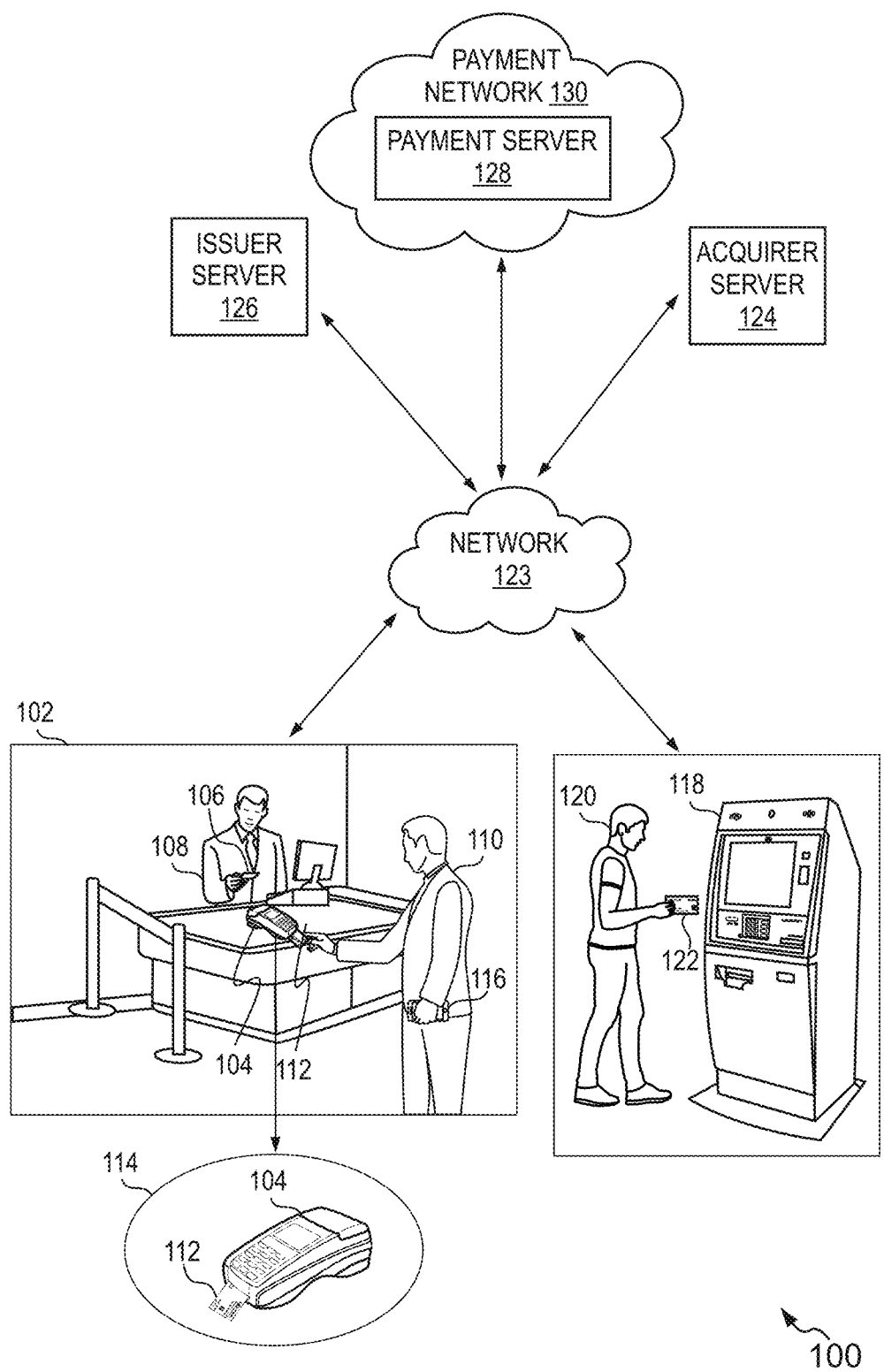
FIG. 1 illustrates an example representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer account" used herein refers to a financial account that is used to fund the financial transaction (interchangeably referred to as "payment transaction"). Further, the term "acquirer account" used herein refers to a financial account of a merchant or any entity which receives the fund from the issuer account. Examples of the issuer account and the acquirer account include, but are not limited to a savings account, a credit account, a checking account, digital wallet, and a virtual payment account. Each of the issuer account and the acquirer account may be associated with an entity such as an individual person, a family, a commercial entity, a company, a corporation, a governmental entity, a non-profit organization, and the like. In some scenarios, an issuer or acquirer account may be a virtual or temporary payment account that can be mapped or linked to a primary payment account, such as those accounts managed by PayPal®, and the like.

The term "payment card", used herein, refers to a physical card linked with a financial or payment account that may be presented to a merchant or any such facility in order to fund a financial transaction via the associated payment account. Additionally or alternatively, the payment card may be used for performing a transaction at a terminal (e.g., ATM terminal). Examples of the payment card include, but are not limited to, debit cards, credit cards, prepaid cards, gift cards, forex cards, charge cards and stored-value cards.

The term "payment network", used herein, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, VISA®, Discover®, American Express®, etc.

Overview

Various embodiments of the present disclosure provide methods and systems for determining the health status of the payment card. More specifically, embodiments provide circuit configurations to determine a physical damage in at least a portion of the payment card. In an example scenario, a cardholder may purchase goods/services at a retail outlet and offer to pay for the goods/services using a payment card. The cardholder can connect his/her payment card to a merchant terminal configured to process transactions. In an example, the cardholder inserts the payment card into a card reader module in the merchant terminal or swipes the payment card therein, or taps the payment card on a reader associated with the merchant terminal. The payment card is activated and displays a health status of the payment card on a display section of the payment card and/or the merchant terminal. The payment card includes electronic circuitry to detect the health status and thereby makes the cardholder aware of a physical condition of the payment card.

Various example embodiments provide methods, systems, electronic devices, and computer program products for displaying a health status of the payment card on a display section of the payment card. In an embodiment, the payment card has a planar body that embodies a payment card processing section. The payment card processing section is a magnetic stripe or a storage chip (e.g., an EMV chip) that includes payment card information such as, financial account number of the cardholder, name of the cardholder and validity information of the payment card. Any physical damage to the payment card processing section or dimensions of the payment card may render it obsolete as the payment card information may not be readable from the payment card by any terminal (e.g., POS terminal and ATM terminal). Therefore, in order to make the cardholder aware of the physical condition of the payment card, the payment card includes an interconnection circuit configured within the planar body so as to detect any physical damage suffered by at least a portion of the payment card processing section, edges, or dimensions of the payment card. The interconnection circuit is an electric circuit that is configured to provide an output voltage proportional to an input voltage applied to the interconnection circuit. Alternatively, the planar body of the payment card is segmented into a plurality of portions and an interconnection circuit is configured for each portion of the plurality of portions. Moreover, each portion is assigned with a priority score indicating significance of that portion for performing a transaction.

When the payment card is swiped/inserted at a terminal or held close to the terminal, the payment card is activated. The output voltage is tracked by a damage sensor which generates a damage signal on sensing any difference in the output voltage. More specifically, any physical damage in the interconnection circuit, alters electrical characteristics of the interconnection circuit which reflects as a change in the output voltage. The payment card further includes an electronic circuit that is configured to receive the damage signal and determine the health status of the payment card as one of (1) a good health condition indicating that the payment card is intact, (2) a deteriorating health condition indicating that the payment card may need a replacement in near future, and (3) a bad health condition (also referred to as 'poor health status') indicating that the payment card needs an immediate replacement. The priority score also influences the health status of the payment card. For instance, if a portion associated with a higher priority score (e.g., the storage chip) is damaged, then the damage signal is amplified so as to indicate a bad health condition of the payment card. More specifically, the priority score emphasizes importance of certain portions of the payment card so as to indicate that any damage to such portions would render the payment card obsolete. In an example embodiment, the damage signal is compared against a first threshold and/or a second threshold to determine the health status for example, as listed below:

(a) If the damage signal is less than the first threshold, the health status of the payment card indicates good health condition of the payment card.

(b) If the damage signal is greater than the first threshold but less than the second threshold, the health status of the payment card indicates deteriorating health condition of the payment card.

(c) If the damage signal is greater than the second threshold, the health status of the payment card indicates bad health condition of the payment card.

The health status is displayed on a display section of the payment card for the cardholder. The display section includes a plurality of color filters that are configured to display a color in response to the health status of the payment card. For example, when the payment card is in good health condition, a first color is displayed in the display section. This ensures that the cardholder takes appropriate action to raise a request for issuance of a new payment card. Moreover, the payment card processing section receives the health status of the payment card from an electronic circuit and stores the health status of the payment card. Furthermore, the payment card processing section appends the health status of the payment card to every transaction request. The transaction request includes payment card information, health status and validity information of the payment card. The transaction request is sent to a server system associated with a payment network. The server system reads the health status and processes a new payment card for the cardholder on determining a deteriorating health condition or a bad health condition of the payment card.

In another example scenario, the payment card may be intact, but validity of the payment card may have expired. When such a payment card is used to perform a transaction at the merchant terminal, the server system reads the validity information to determine if the payment card is a valid payment card or an invalid payment card. If the payment card is an invalid payment card as determined from the validity information, then the server system accesses the health status of the payment card. If the health status of the payment card indicates that the physical condition of the payment card is good, the server system automatically extends a validity of the payment card for a predefined time, for example, 3 months or 6 months. Additionally or optionally, the server system sends a validity extension information including the predefined time to the payment card. The payment card processing section updates the validity information stored in it from a first date to a second date based on the predefined time. The payment card need not be replaced and can be used for performing subsequent transactions.

Various example embodiments of present invention are described hereinafter with reference to FIGS. 1 to 14.

FIG. 1 illustrates an exemplary representation of an environment 100, in which at least some example embodiments of the present disclosure can be implemented. In the illustrated environment 100, a cardholder 110 visits a merchant facility 102 (also referred to herein as 'a merchant 102') for purchasing goods. The merchant facility 102 is equipped with a merchant terminal 104 (hereinafter also referred to as POS terminal 104' or POS machine 104') and a merchant interface device 106. Examples of the merchant facility 102 may include any retail establishments such as, restaurant, supermarket, exhibition, or business establishments such as, government and/or private agencies, toll gates, parking lot where customers visit for performing financial transaction in exchange for any goods and/or services or any transaction that requires financial transaction between customers and a merchant. In various embodiments, the merchant interface device 106 can be a telephone or a computer system operated by an agent 108 for performing payment transactions on behalf of a customer, for example, the cardholder 110. In some example embodiments, the merchant terminal 104 may be a POS machine or a Near Field Communication (NFC) card reader that may be configured to read a payment card information of the payment card 112 from a magnetic stripe or an EMV chip housed in the payment card 112. It shall be noted that herein the merchant terminal 104 refers to a POS machine which is used to swipe payment cards and not the entire setup including, cash drawers, printers, and barcode scanners.

In one embodiment, the NFC card reader may be configured on an electronic device, for example, a cardholder device 116 associated with the cardholder 110. Examples of the electronic device include, but are not limited to, a personal computer (PC), a tablet device, a personal digital assistant (PDA), a smartphone and a laptop. In at least one example embodiment, a server system (e.g., an issuer server 126, an acquirer server 124) associated with a payment network 130 facilitates a web or a mobile application interface (also referred to as a 'payment application') for reading the payment card information from the payment card 112 prior to initiating a transaction. For example, the cardholder 110 purchases goods at the merchant facility 102 and a billing information appears on the merchant interface device 106. The merchant interface device 106 can share the billing information with the cardholder 110 via the payment application on the cardholder device 116. In an example, the cardholder 110 may use the cardholder device 116 to connect with the payment card 112 and read the payment card information of the payment card 112 via the payment application. The cardholder device 116 captures the payment card information and the payment application is configured to manage the transaction between the merchant 102 and the cardholder 110.

The environment 100 also exemplarily depicts a kiosk equipped with a transaction terminal 118 which cardholders, for example, a cardholder 120 visits to perform transactions such as, withdrawal of cash from a cardholder account, transfer of cash to another cardholder account or for depositing cash to the cardholder account/another cardholder account of the cardholder via the transaction terminal 118. An example of the transaction terminal 118 is the ATM machine, and the terms 'transaction terminal 118' and 'ATM machine 118' have been used herein interchangeably. The cardholder 120 may insert a payment card 122 in a card reader module of the ATM machine 118 that may read payment card details of the cardholder 120 for initiating the transaction. In an example scenario, if the payment card 112 or payment card 122 suffers a physical damage, for example, a scratch on the magnetic stripe including the payment card information, chipping of an edge of the payment cards 112,122, the merchant terminal 104 or the transaction terminal 118 may not be able to read the payment card information from the payment cards 112, 122. The payment cards 112, 122 may be damaged due to chipping of edges of the payment card due to excessive usage, scratches on the EMV chip or the magnetic stripe, and the like. This may create a bad experience for the cardholders 110, 120 who may not be able to complete the transaction at the merchant terminal 104, and transaction terminal 118 due to the damage/physical condition of the payment cards 112, 122. In an embodiment, each of the payment cards 112, 122 includes a health status indicator for displaying the physical condition or the health status of the payment card to the respective cardholders 110, 120. It shall be noted that hereinafter, detecting any damage on a payment card and displaying a physical condition/health status of the payment card 122 have been explained with reference to the payment card 112 and the same process can be employed by the payment card 122.

Figure 2A:
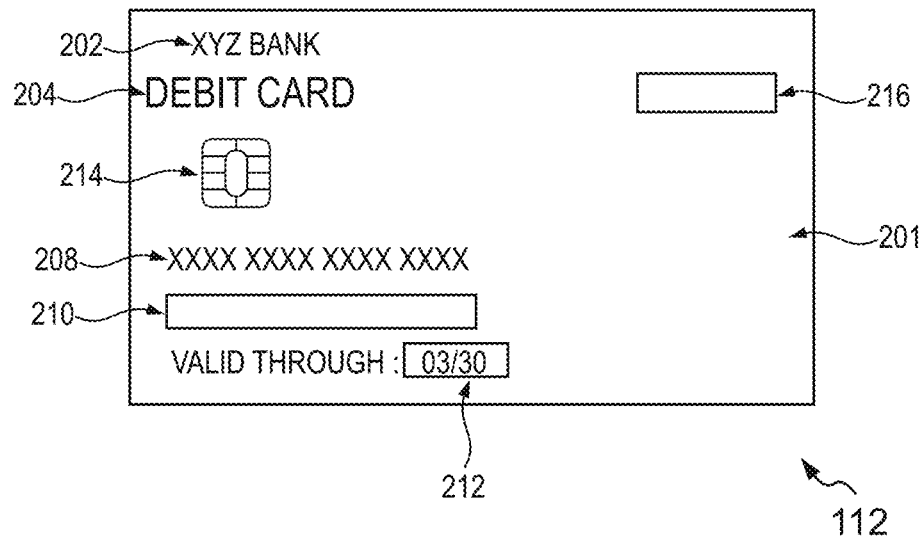
FIG. 2A illustrates a simplified representation of a front portion of a payment card with a display section indicating health status of the payment card, in accordance with an example embodiment.
Figure 2B:
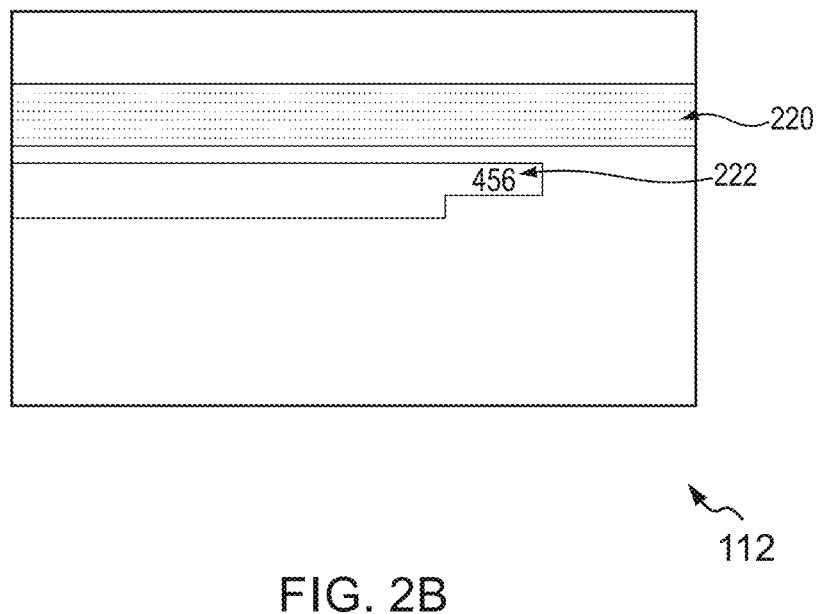
FIG. 2B illustrates a simplified representation of a back portion of a payment card, in accordance with an example embodiment.

Referring now to FIG. 2A, a payment card 112 including a display section 216 indicating health status of the payment card 112 among other components is shown in accordance with an example embodiment. It shall be noted that the payment card 112 may be a plastic card or an electronic payment card including a keypad and a display. As seen in FIG. 2A, the payment card 112 has a planar body 201 housing electronic components for facilitating transactions at terminals (e.g., the merchant terminal 104, the transaction terminal 118). The payment card 112 includes information such as name of issuing bank (e.g., XYZ Bank) 202, type of card (e.g., credit/debit) 204, card number 208, name of the cardholder 210, validity information of the payment card 212 printed on one surface (shown in FIG. 2A) of the payment card 112. The payment card 112 includes a storage chip 214 provisioned on the surface of the payment card 112 where the printed information appears. The other surface of the payment card 112, which is shown in FIG. 2B, optionally includes a magnetic stripe 220, information such as a Card Verification Value (CVV) number 222 and other information as may be already known in the art. The storage chip 214 stores information corresponding to the payment card 112 and the cardholder 110. The storage chip 214 further stores instructions to read the health status of the payment card 112, update validity information of the payment card 112, and connect with remote devices such as the POS terminal 104. As an example, the storage chip 214 may include instructions to connect with a Near Field Communication (NFC) terminal for processing a payment transaction. Additionally, the storage chip 214 is configured to store health status information of the payment card 112. For example, health status of the payment card during past 5 transactions performed by the cardholder 110 may be stored in the storage chip 214.

The payment card 112 includes a display section 216 that displays the health status of the payment card 112 for the cardholder 110. The health status indicates a physical condition of the payment card 112. In an example, the health status of the payment card 112 may be indicated by display of one or more colors on the display section 216. Without loss of generality, in an example, a green color may be displayed on determining a good health condition of the payment card 112, orange color may be displayed on determining a deteriorating health condition of the payment card 112, and red color may be displayed on determining a bad health condition of the payment card 112. In an embodiment, the payment card 112 may be configured such that when the payment card 112 is inserted into a card reader module at the POS terminal or held close to the NFC terminal, the electrical components of the payment card 112 are powered ON and the display section 216 displays the health status of the payment card 112. In another embodiment, a communication module (not shown) in the payment card 112 transfers the information in the storage chip 214 to the POS terminal 104 or the NFC terminal that displays the health status of the payment card 112 for the cardholder 110. It shall be noted that some POS terminals are equipped with an NFC card reader module to read payment card information and initiate transactions for the cardholder 110.

Figure 2C:
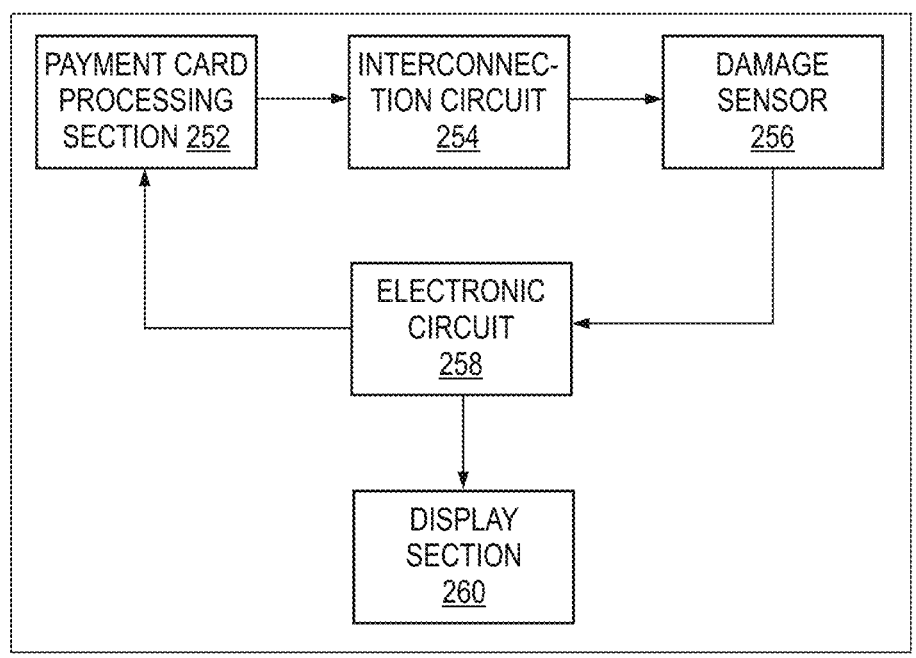
FIG. 2C illustrates a simplified block diagram of a payment card for determining health status of the payment card, in accordance with an example embodiment.

Referring now to FIG. 2C, a simplified schematic representation 250 of a block diagram of a payment card 112 of FIG. 2A for determining health status of the payment card 112, is illustrated in accordance with an example embodiment. The payment card 112 has a planar body (e.g., planar body 201) housing electronic components for processing transactions when activated by a terminal (see, merchant terminal 104, transaction terminal 118).

The representation 250 depicts a payment card processing section 252. The payment card processing section 252 includes one or more electrical components that facilitate transactions for the cardholder 110. In an embodiment, the payment card processing section 252 includes an EMV chip (see, the storage chip 214 of FIG. 2A) and/or a magnetic stripe. The payment card processing section 252 includes (1) executable instructions to process transactions, for example, instructions for connecting to remote terminals, (2) memory component for storing payment card information, such as, cardholder name, cardholder account number, name of issuer, PIN, validity information, etc., and transaction history such as, transaction amount, terminal identifier, transaction date, etc.

Figure 2E:
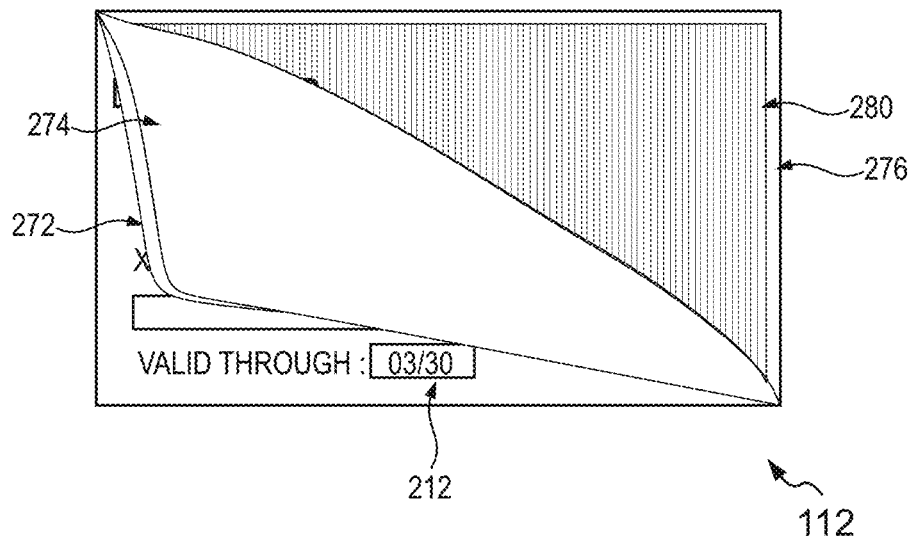
FIG. 2E illustrates a schematic view of a portion of the interconnection circuit configured within the payment card upon removing/peeling a top layer of the payment card of FIG. 2A, in accordance with an example embodiment.

In an embodiment, an interconnection circuit 254 is configured within the payment card 112 for detecting a physical damage of at least a portion of the planar body or the payment card processing section 252 in the payment card 112. For example, if an edge of the payment card 112 that may be inserted into the POS terminal 104 is chipped off, the interconnection circuit 254 is configured to detect this physical damage. In one example, the interconnection circuit 254 is a mesh circuit as shown in FIG. 2E. Although one interconnection circuit 254 is shown in the representation 250, the payment card 112 may include a plurality of interconnection circuits and each interconnection circuit may be configured to determine physical damage to a specific portion of the payment card 112. An example of the plurality of interconnection circuits configured on the payment card 112 for determining health status of the payment card 112 is shown and explained with reference to FIG. 3.

In some example embodiments, the interconnection circuit 254 may be configured only on the payment card processing section 252 and an edge portion (e.g., left edge portion) of the payment card 112 that is configured to be inserted into the POS terminal 104. In another embodiment, the interconnection circuit 254 is configured to cover entire payment card 112 so as to detect the physical damage suffered by any portion of the payment card 112. Any physical damage to the payment card 112 may alter resistance offered by a branch associated with a portion that suffered the physical damage in the interconnection circuit 254, thereby affecting an output voltage of the interconnection circuit 254. The interconnection circuit 254 may be any circuit configuration including one or more elements as may be already known in the art, for example, strain sensors, pressure sensors, piezoelectric devices for determining the physical damage in the payment card 112. In an example embodiment, a force sensitive resistor with a sensing area configured on the payment card processing section 252 and at least a portion of the planar body can be used to detect a force applied on the payment card 112 that may eventually result in a physical damage of the payment card 112. The force sensitive resistor is a variable resistor and a resistance offered by the force sensitive resistor varies based on a force/pressure that is applied on the sensing area. For instance, when no pressure is applied on the sensing area, the resistance offered by the force sensitive resistor increases. Alternatively, when the force applied on the sensing area is high, the resistance offered by the force sensitive resistor decreases. The change in resistance of the interconnection circuit 254 employing the force sensitive resistor triggers the damage signal. It shall be noted that hereinafter the invention is described with reference to the interconnection circuit shown in FIG. 2E for the sake of brevity. However, it should be noted that various embodiments of the disclosure may be practiced with various configurations of the interconnection circuit 254 configured to detect the physical damage in the payment card 112.

The payment card 112 includes a damage sensor 256 configured to generate a damage signal in response to any physical damage detected in the interconnection circuit 254. For example, a physical damage, say, a crack in the EMV chip may result in discontinuity in a branch of the interconnection circuit 254. More specifically, the interconnection circuit 254 is not complete and acts as an open circuit due to damage suffered by the branch or branches associated with the EMV chip. The damage sensor 256 may detect a change in the output voltage of the interconnection circuit 254 and generates the damage signal. In another example embodiment, when the interconnection circuit 254 employs a force sensitive resistor, the damage sensor 256 may be configured to determine a change in resistance and generate the damage signal in response to the change in the resistance of the interconnection circuit 254.

The representation 250 depicts an electronic circuit 258 that receives the damage signal from the damage sensor 256. The electronic circuit 258 is configured to compare the damage signal with a first threshold ($T_1$) and a second threshold ($T_2$) to determine a health status of the payment card 112. If the damage signal is less than the first threshold ($T_1$), the physical damage suffered by the payment card is insignificant. Alternatively, the electronic circuit 258 determines that the payment card 112 is in a good health condition if the damage signal is less than the first threshold ($T_1$). In an embodiment, if the damage signal is greater than the first threshold ($T_1$) but less than the second threshold ($T_2$), the electronic circuit 258 determines the health status of the payment card 112 as a deteriorating health condition. If the damage signal is greater than the second threshold ($T_2$), the electronic circuit 258 determines the health status of the payment card 112 as a bad health condition. In some example embodiments, the electronic circuit 258 sends the health status of the payment card 112 to the payment card processing section 252. The payment card processing section 252 is configured to store the health status of the payment card 112. In at least one example embodiment, when the payment card 112 is used to perform a transaction at a terminal (e.g., the merchant terminal 104, the transaction terminal 118), the payment card processing section 252 appends the health status of the payment card 112 with a transaction request.

The planar body 201 of the payment card 112 includes a display section 260 for displaying the health status of the payment card 112 for the cardholder 110. In one embodiment, the display section 260 includes a plurality of color filters configured to display a color in response to the damage signal. For example, a first color is displayed in the display section 260 when the health status of the payment card 112 is in a good health condition, a second color is displayed in the display section 260 when the health status of the payment card 112 is in a deteriorating health condition, and a third color is displayed in the display section 260 when the health status of the payment card 112 is in a bad health condition. In some example embodiments, a chemical reaction is initiated in the payment card 112 when the damage signal is greater than a second threshold to abruptly change colors from the first color (indicating good health condition) or the second color (indicating deteriorating health condition) to the third color (indicating bad health condition). Similarly, a chemical reaction is triggered in the display section 260 to change from the first color (indicating good health condition) to the second color (indicating deteriorating health condition) when the damage signal is less than the second threshold but greater than the first threshold. In an embodiment, the display section 260 is a thin flat panel display that employs light modulating properties of liquid crystals. An example of the display section 260 may be a photovoltaic display, or a liquid emitting diode-based display that displays notifications pertaining to the health status of the payment card 112. In another example, the display section may display a color corresponding to the health status of the payment card 112. In other embodiments, the display section 260 may be a liquid crystal diode (LCD) display or plasma display.

Referring again to FIG. 1, in a scenario, the cardholder 110 hands over the payment card 112 to the agent 108 at the merchant terminal 104 to pay for the goods purchased at the merchant 102. The agent 108 may swipe the payment card 112 or insert the payment card 112 into a card reader module at the merchant terminal 104 that powers ON the payment card 112. Once powered ON, the display section 216 displays a health status of the payment card 112 (see, 114). For example, if there is a small scratch on the magnetic stripe of the payment card 112 and if the scratch is not so significant that the card reader module of the merchant terminal 104 is unable to read the payment card information, the display section 216 displays a color indicating the health status of the payment card 112, for example, orange color indicating deteriorating health condition. More specifically, a part (or branch B2) of the interconnection circuit 254 configured on the payment card processing section 252 (the magnetic stripe) may either be disconnected or result in an open circuit due to the physical damage suffered by the branch B2. The damage signal generated in response to this physical damage is compared with a first threshold ($T_1$). In this example, the damage may be insignificant, and the damage signal is less than the first threshold ($T_1$). The damage signal is then compared with a second threshold ($T_2$). If the damage signal is greater than the second threshold ($T_2$) but less than the first threshold ($T_1$), the electronic circuit 258 in the payment card 112 determines that the health status of the payment card 112 is deteriorating. The health status of the payment card 112 indicating deteriorating health condition implies that any further physical damage to any portion of the payment card 112, specifically, the magnetic stripe may render the payment card 112 unusable for performing transactions. This ensures that the cardholder 110 is aware of the physical condition of the payment card 112. In some example embodiments, the health status of the payment card 112 is displayed on the merchant terminal 104/transaction terminal 118. For example, if the payment card 112 is swiped at the merchant terminal 104 or inserted into the card reader module of the transaction terminal 118, the merchant terminal 104/transaction terminal 118 reads the health status of the payment card 112/payment card 122 from the payment card processing section 252 and displays it on the merchant terminal 104/transaction terminal 118.

In some example embodiments, the health status of the payment card 112 is appended to a transaction request. For example, upon swiping the payment card 112 at the merchant terminal 104, a transaction request is generated and the transaction between the cardholder 110 (issuer account) and the merchant 102 (acquirer account) is facilitated by one or more server systems and the payment network 130. Examples of the server systems include the issuer server 126, the acquirer server 124 and the payment server 128. In some cases, the issuer server 126, the acquirer server 124 and the payment server 128 can be a single entity, or any two of these servers may be a single entity. The transaction request includes a transaction amount associated with a current purchase of goods at the merchant facility 102, payment card information of the cardholder 110 and the health status of the payment card 112. The transaction request is received by the acquirer server 124 which sends it to the payment server 128 through the payment network 130. The payment server 128 forwards the transaction request to the issuer server 126. In an embodiment, the issuer server 126 reads the health status of the payment card 112 and determines if a new payment card has to be issued for the cardholder 110 based on the health status of the payment card 112. In an example, if the health status of the payment card 112 is read by the issuer server 126 as a deteriorating health condition or a bad health condition, the issuer server 126 may automatically initiate a payment card request for a new payment card for the cardholder 110.

In an example scenario, the cardholder 110 may frequently use the payment card 112 for performing transactions at the terminals, transaction terminal 118 and/or the merchant terminal 104. The payment card 112 may get worn out due to such frequent usage and this may be detected by the interconnection circuit 254 and the display section 216 will display a deteriorating health condition of the payment card 112. In some example embodiments, the issuer server 126 may access historical data associated with health status of the payment card 112 to determine usage characteristics of the payment card 112. For instance, the issuer server 126 reads the usage characteristics of the payment card 112 and health status of the payment card 112 during the transactions, for example, past 5 transactions. In an embodiment, if the issuer server 126 determines that the payment card 112 has been used frequently and if the health status of the payment card 112 is in deteriorating health condition, the issuer server 126 is configured to automatically process a payment card request for a new payment card on behalf of the cardholder 110.

In some example scenarios, a validity of the payment card 112 may have expired or may be on the verge of expiring, for example, another 5 days for expiry of the payment card 112. Although the validity information of the payment card (see, 212 of FIG. 2A) is printed on the payment card 112, the cardholder 110 may not have noticed the validity information of the payment card 112 before performing a transaction. The cardholder 110 may use the payment card 112 for initiating a transaction request at the merchant terminal 104. The payment card information includes the validity information of the payment card 112. The issuer server 126 on receiving the transaction request verifies the payment card information including the validity information. The issuer server 126 determines if the payment card is a valid card or an invalid card whose validity has expired. In at least one example embodiment, the issuer server 126 retrieves the health status of the payment card 112 on determining the payment card 112 as an invalid card. For instance, if the payment card 112 is valid till November 2019 and if the cardholder 110 performs the transaction on December 2019 at the merchant terminal 104, the issuer server 126 determines the payment card 112 to be an invalid card. Subsequently, the issuer server 126 reads the health status of the payment card 112. In some example embodiments, the issuer server 126 may access historical data associated with the health status of the payment card 112. For instance, usage information and health status of the payment card 112 during the past 10 transactions are retrieved by the issuer server 126.

In at least one example embodiment, the issuer server 126 may extend the validity of the payment card 112 based on the health status or the historical data associated with the health status of the payment card 112 for a predefined time. In some example embodiments, the predefined time may be dependent on the health status and/or the historical data associated with the health status of the payment card 112. For example, on determining that the health status of the payment card 112 (invalid card) is in good health condition, and additionally the historical data showing that the payment card 112 has been used for 100 transactions but the payment card 112 has a good health condition, drives the issuer server 126 to extend the validity of the payment card 112 by the predefined time (e.g., 6 months). Alternatively, assuming the payment card 112 had a validity for 3 years and the payment card 112 had been used sparingly, say, 10 times in the first 2 years but more extensively, say, 50 times over the last one year and if the health status of the payment card 112 indicates good health condition, a mathematical modeling technique may be used to determine the predefined time. The mathematical modeling may suggest that the payment card 112 may have a shorter time span if the payment card 112 is used extensively over 6 months (predefined time) and may henceforth suggest a 3 month (predefined time) extension of the validity. It shall be noted that the predefined time quoted here is an exemplary and the issuer may preset the predefined time based on one or more factors other than the common factors listed here, mathematical modeling techniques, prediction techniques for predicting a physical damage to the payment card 112 or have default fixed time periods for extending the validity of the payment card 112. In at least one example embodiment, the issuer server 126 sends a validity extension information to the merchant terminal 104 that initiated the transaction request for the payment card 112. The validity extension information includes a first valid date indicating an expiry date of the payment card 112 and a second valid date determined by the issuer server 126 based on the predefined time. In an embodiment, the merchant terminal 104 is configured to update/write the second valid date in the validity information of the payment card 112. An example of a table maintained at the issuer server 126 depicting historical data associated with health status of the payment card 112 is shown and explained with reference to FIGS. 7A and 7B.

In another example scenario, the cardholder 110 may be aware of the expiry of the validity of the payment card 112. Additionally, if the physical condition of the payment card 112 is intact as indicated by the health status indicator of the payment card 112 during the last transaction, the cardholder 110 may not need a new payment card. In at least one example embodiment, the cardholder 110 may initiate the payment card issuance request on determining that the validity of the payment card has expired but the payment card 112 is intact with no physical damage. Accordingly, the cardholder 110 may access the payment application on the associated cardholder device 116 and initiate a validity extension request. The issuer server 126 may employ techniques described above to determine the predefined time for extending the validity of the payment card 112.

Referring again to FIG. 1, the issuer server 126 verifies the transaction request received from the merchant terminals 104/transaction terminal 118. Upon verification by the issuer server 126, the payment server 128 helps in authorizing the transaction between the issuer server 126 and an acquirer server 124, and later settles the transaction by transferring the transaction amount from an issuer account of the cardholder 110 to an acquirer account of the merchant 102. Examples of the payment network 130 include, but not limited to, Mastercard® payment system interchange network. The Mastercard® payment system interchange network is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.).

Additionally or optionally, the issuer server 126 may send a notification of transaction successful/failure to the merchant terminal 104 for notifying the cardholder 110 about the transaction via a network 123. The network 123 may include wired networks, wireless networks, and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of the combination of wired and wireless networks may include the Internet.

Referring now to FIG. 2D, a perspective view 270 of different layers of the payment card 112 of FIG. 2A is illustrated in accordance with an example embodiment. As shown in FIG. 2D, the payment card 112 includes multiple layers of plastic foils that are bound together. As seen in FIG. 2D, the top layer 272 is a printed sheet depicting payment card information of the payment card 112. Further, the payment card 112 includes one or more core layers, namely a first layer 274, a second layer 276, and a third layer 278. The first layer 274 houses the storage chip 214 and the display section 216. The second layer 276 embodies the components for determining the physical condition/health status of the payment card 112. In an example embodiment, the second layer 276 includes an interconnection circuit 280, a damage sensor (not shown) and an electronic circuit (not shown). It shall be noted that the damage sensor and the electronic circuit may be embodied on an opposite side of the second layer 276 and are not shown in FIG. 2D. Additionally or optionally, the third layer 278 of the payment card 112 includes a magnetic stripe. Optionally, there may be a transparent protective sheet overlaying the top layer 272 for protecting the printed sheet and/or the third layer 278. The layers of the payment card 112 described above are for exemplary purposes only and it should be noted that various embodiments of the disclosure may be practiced with various configurations, modifications, rearrangements of components/layers, variation in the number of layers to detect the physical damage in the payment card 112. Moreover, the layers 272, 274, 276, 278 are bound together either by lamination or any other binding techniques known in the art.

As shown in FIG. 2E, when the top layer 272 and the first layer 274 of the payment card 112 are peeled/removed, a portion of the interconnection circuit 280 configured to detect the physical condition of the payment card 112 is visible. In this example, the interconnection circuit 280 is configured as a mesh circuit with a plurality of interconnected conducting wires so as to detect any physical damage to a payment card processing section, the storage chip in the first layer 274 or magnetic stripe in the third layer 278 and/or the physical damage suffered by any portion of the payment card 112. In an example embodiment, branches of the interconnection circuit 280 (shown in FIG. 2F) are closely spaced so as to detect physical damage at any portion of the payment card 112. Although, this example representation depicts the interconnection circuit 280 to be configured on the entire payment card 112 so as to detect damage in any portion of the payment card 112, it shall be understood that the interconnection circuit 280 may be configured only at select portions of the payment card 112 that are likely to suffer physical damage and may hamper any terminal (e.g., the merchant terminal 104, the transaction terminal 118) from reading the payment card 112. In an example, the interconnection circuit 280 may be configured to detect any physical damage suffered by the EMV chip, the magnetic stripe, and a left end portion of the payment card 112 that may be inserted in the card reader module of the merchant terminal 104.

Figure 2F:
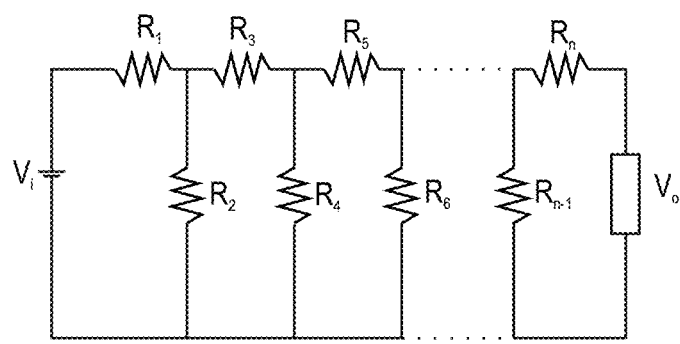
FIG. 2F illustrates an interconnection circuit configured within the planar body of the payment card of FIG. 2A for determining a health status of the payment card, in accordance with an example embodiment.

The interconnection circuit 280 can be configured within the planar body of the payment card 112 of FIG. 2A for determining a health status of the payment card 112. The interconnection circuit 280 is an example of the interconnection circuit 254 shown and explained with reference to FIG. 2C. The interconnection circuit 280 includes a plurality of electrical wires connected together in a parallel fashion. It shall be noted that resistances ($R_1, R_2, R_3, \ldots, R_n$) depicted in FIG. 2F are the resistances offered by a respective branch in the interconnection circuit 280. For example, a branch B1 offers a resistance $R_1$, a branch B2 offers a resistance $R_2$, a branch B3 offers a resistance $R_3$, a branch B4 offers a resistance $R_4$, and so on. In this example representation, input voltage is depicted by a voltage source $V_i$ and output voltage $V_o$ is measured across the resistor $R_n$. The voltage source is powered on when the payment card 112 is activated by an external power source. For example, when the payment card 112 is inserted in a card reader module of a POS terminal (e.g., the POS terminal 104) or comes in field of NFC reader associated with the POS terminal, the voltage source receives power from the POS terminal 104. Subsequently, the output voltage $V_o$ across the resistor $R_n$ is measured. Assuming, branches B4, B5, B6 associated with resistances $R_4, R_5, R_6$ are configured below the storage chip (see, the storage chip 214) for determining physical condition of the storage chip 214. In an example scenario, if the storage chip 214 cracks, the crack is reflected in the branches B4, B5, B6. The resistance ($R_4, R_5, R_6$) offered by the branches B4, B5, B6 change which may result in a change in the output voltage $V_o$. For example, if the crack is significantly large that the chips break into two, the branch B5, B6 may break, resulting in an open circuit. Accordingly, the output voltage $V_o$ measured across the resistor $R_n$ is zero. Such a change in the output voltage may generate a damage signal to the damage sensor (see, the damage sensor 256). Alternatively, the crack is insignificant, the resistance ($R_4, R_5, R_6$) offered by the branches B4, B5, B6 may vary slightly, thereby resulting in a change in the output voltage which may generate the damage signal. It shall be noted that the circuit configuration and circuit elements are shown for exemplary purpose only and the invention can be practiced with any modification in the circuit configuration and the circuit elements.

Figure 3:
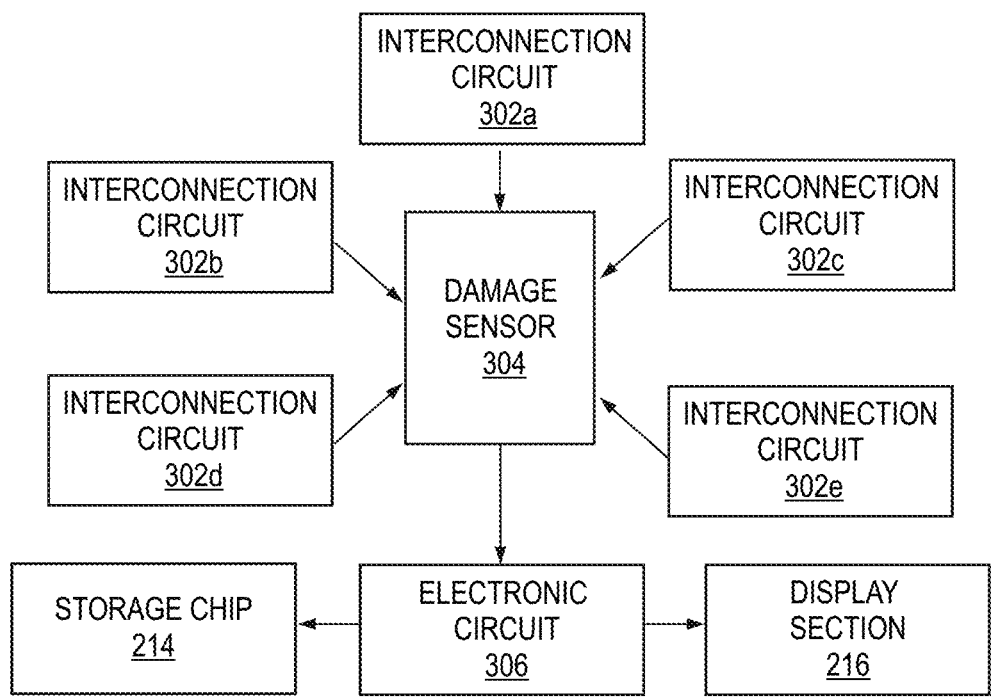
FIG. 3 illustrates a simplified block diagram of a payment card of FIG. 2A for determining health status of the payment card, in accordance with another example embodiment.

Referring now to FIG. 3, a simplified schematic representation 300 of a block diagram of a payment card 112 of FIG. 2A for determining health status of the payment card 112 is illustrated in accordance with another example embodiment. In this example embodiment, a plurality of interconnection circuits (see, 302a, 302b, 302c, 302d, 302e) are configured within the payment card 112 to detect physical condition of at least a portion of the payment card 112. The payment card 112 is segregated into a plurality of portions and an interconnection circuit is configured for each portion of the plurality of portions. For example, the payment card 112 is segregated into multiple portions and an interconnection circuit is configured in each portion.

As explained with reference to FIG. 2D, the payment card 112 includes a plurality of layers and accordingly, the plurality of interconnection circuits can be configured on a single layer or distributed over multiple layers. For example, an interconnection circuit (I1) is configured to determine change in physical condition of the storage chip 214, an interconnection circuit (I2) is configured to determine any change in physical condition of a top planar body excluding the storage chip, an interconnection circuit (I3) is configured to detect any damage to the magnetic stripe (see, 220 in FIG. 2B) and an interconnection circuit (I4) is configured to detect damages in a bottom planar body of the payment card 112 excluding a portion covered by the magnetic stripe of the payment card 112. In the above example, the interconnection circuits I1 and I2 may be configured on one layer (L1) and the interconnection circuits I3 and I4 can be configured on a different layer (L2).

In this representation 300, the payment card 112 is segregated into 5 portions (P1, P2, P3, P4, P5) and each portion is associated with an interconnection circuit, for example, P1 is associated with the interconnection circuit 302a, P2 is associated with the interconnection circuit 302b, P3 is associated with the interconnection circuit 302c, P4 is associated with the interconnection circuit 302d and P5 is associated with the interconnection circuit 302e. As shown in FIG. 3, the portion P1 is associated with a left part of the payment card 112 that is inserted into the card reader module of the POS terminal 104 and/or the transaction terminal 118, the portion P2 is associated with the magnetic stripe of the payment card 112 that houses payment card information, the portion P3 is associated with a top part of the payment card, the portions P4 and P5 include a lower part of the payment card 112 that has relatively lesser importance. However, it shall be noted that the interconnection circuits 302a, 302b, 302c, 302d, 302e are shown for example purposes only and the payment card 112 may include fewer or more number of interconnection circuits and these interconnection circuits may be configured on any portion of the payment card 112. For example, the interconnection circuits may be configured only at those portions of the payment card 112 housing the payment card processing section and/or a left portion of the payment card 112 that is inserted into a card reader module of the merchant terminal 104 and/or the transaction terminal 118. Moreover, the interconnection circuits 302a, 302b, 302c, 302d, 302e are activated by an external power supply, for example, the payment card 112 is activated when the payment card 112 is inserted into the card reader module of the POS terminal 104 or the transaction terminal 118, or receive power from radiation of an NFC reader associated with the POS terminal. An example of the interconnection circuits 302a, 302b, 302c, 302d, 302e is shown and explained with reference to FIG. 2F.

In an embodiment, the interconnection circuits 302a, 302b, 302c, 302d and 302e are connected to a damage sensor 304. The damage sensor 304 is configured to generate a damage signal in response to a damage detected in any one of the portions P1, P2, P3, P4, P5. For instance, the damage sensor 304 is configured to receive output voltages (V1, V2, V3, V4, V5) from each of the interconnection circuits 302a, 302b, 302c, 302d, 302e, respectively. The damage sensor 304 is configured to determine any drastic change in output voltages (V1, V2, V3, V4, and V5). The damage sensor 304 is configured to compare the output voltages (V1, V2, V3, V4, and V5) with expected output voltages (E1, E2, E3, E4, E5), respectively to determine changes in the output voltages (V1, V2, V3, V4, and V5). In an example scenario, assume that the portion P3 of the payment card 112 has developed a small crack due to rough handling and shoving of the payment card 112 into a wallet. The interconnection circuit 302c may experience a discontinuity in a branch of electrical circuit configured below the crack in the portion P3. Accordingly, the output voltage V3 of the interconnection circuit 302c may vary slightly from an expected voltage E3. This difference in voltage between the output voltage (V3) and the expected voltage E3 triggers an error signal (S1). The error signal (S1) is proportional to the difference in voltages E3 and V3 as determined by the damage sensor 304.

In some example embodiments, an error vector (R) is also generated by the damage sensor 304. The error vector (R) indicates the portion of the payment card 112 that has suffered physical damage. More specifically, the error vector (R) depicts one or more interconnection circuits of the plurality of interconnection circuits 302a, 302b, 302c, 302d, 302e that show a difference in voltage levels based on an expected voltage and the output voltage due to physical damage of the payment card 112 that reflects in the one or more interconnection circuits. The error vector (R) is a n-dimensional vector, where 'n' denotes the number of interconnection circuits in the payment card 112. For instance, the payment card 112, with the interconnection circuits 302a, 302b, 302c, 302d and 302e, has a 5-dimensional error vector. As explained above, when the damage sensor 304 detects difference in voltage from the interconnection circuit 302c associated with the portion P3, it sets a corresponding vector component to a 'high' or '1' in an error vector R1 [00100]. It shall be noted that by default all vector components of the error vector R are preset to a 'low' or '0' and a difference in voltage between the expected and the output voltage triggers the damage sensor 304 to set a vector component corresponding to damaged portion to 'high' or '1'.

In another example scenario, it may be assumed that the portion P2 housing the magnetic stripe develops a deep scratch due to a key press on the payment card 112 when carried in a pocket. This may result in an open circuit in the interconnection circuit 302b configured within the portion P2. Hence, the output voltage V2 may vary drastically compared to the expected voltage E2. Accordingly, the damage sensor 304 generates an error signal (S2) proportional to a difference between the output voltage V2 and the expected voltage E2. The damage sensor 304 generates an error vector R2 as [01000] corresponding to a portion that has suffered physical damage, for example, the portion P2 in this case.

In at least one example embodiment, each portion of the plurality of portions P1, P2, P3, P4, P5 is assigned a priority score based on a significance of the portion of the payment card 112 to carry out the transaction. For example, the portion P1 includes the left part of the payment card 112 and the storage chip which constitutes the most significant components for initiating transactions at the merchant terminal 104 and/or the transaction terminal 118. Therefore, the portion P1 is assigned a priority score of 0.5. The portion P2 including the magnetic stripe is also an essential element for initiating transactions at terminals (e.g., the merchant terminal 104 and/or the transaction terminal 118). Additionally or alternatively, payment card information embedded in the magnetic stripe is also stored in the storage chip. However, the portion P2 housing the magnetic stripe is a significant component and is assigned a priority score of 0.35. The portions P3, P4 and P5 cover a remaining portion of the payment card 112 and form a planar body for the payment card 112. The portions P3, P4, P5 have a relatively lesser significance and may not embody any electrical/electronic components essential for processing a transaction. Hence in an example, the portions, P3, P4 and P5 are assigned a priority score of 0.05, 0.05, and 0.05, respectively. In some example embodiments, the damage sensor 304 generates the damage signal based at least on the error signal (S), the error vector (R), and the priority score. For example, the damage sensor 304 generates a damage signal D1 based on the error signal S1, the error vector R1 and the priority score associated with the portion of the payment card 112 that has suffered physical damage (the portion P3). As the portion P3 is insignificant, the damage signal (S1) would reflect the error signal (S1) in a minimized form due to the priority score (0.05) of P3. The damage signal D2 is generated based on the error signal S2, the error vector R2 and the priority score associated with the portion P2. The portion P2 has the priority score of 0.35 and the error signal S2 is amplified by the priority score (0.35) to generate the damage signal D2 that reflects the damage suffered by the magnetic stripe.

In one example embodiment, the damage sensor 304 sends the damage signal to an electronic circuit 306. The electronic circuit 306 is configured to determine health status of the payment card 112 based on the damage signal. The electronic circuit 306 compares the damage signal with one or more thresholds to determine the health status of the payment card 112. An example of classifying/determining the health status of the payment card 112 is shown below.

(a) D<T, the payment card 112 is in good health condition (b) D>T, the payment card 112 is in bad health condition where D is the damage signal from the damage sensor, and T is the threshold preset in the electronic circuit for determining the health status of the payment card.

In an example, the electronic circuit 306 receives the damage signal D1 proportional to a crack in the portion P3. The damage signal D1 is compared with the threshold (T) and the damage being insignificant is less than the threshold (T), the health status of the payment card 112 is determined to be a good health condition. Moreover, the priority score associated with the portion P3 is less which makes the damage signal D1 less than the threshold T. However, the deep scratch on the magnetic stripe coupled with the priority score assigned to the portion P2 results in the damage signal D2 that is greater than the threshold (T). Accordingly, the electronic circuit 306 is configured to classify the physical condition of the payment card 112 as a bad health condition. The health status of the payment card 112 is displayed to the cardholder on a suitable display, for example, the display section 216 (see, FIG. 2A). An example of the payment card 112 displaying health status of the payment card 112 is shown and explained with reference to FIGS. 4A-4B. Additionally or optionally, the health status of the payment card 112 may be displayed on a terminal (e.g., the merchant terminal 104, the transaction terminal 118).

Figure 4A:
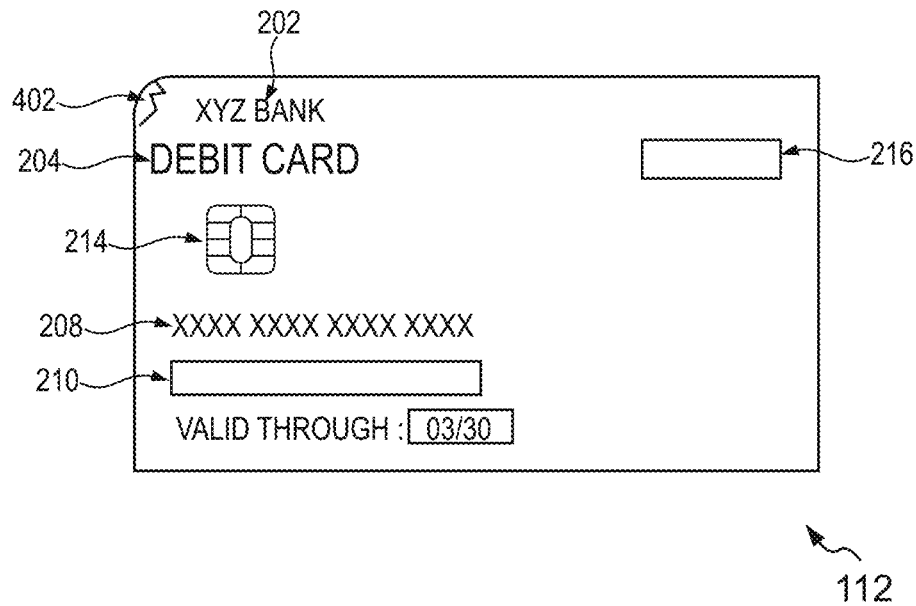
FIG. 4A illustrates a simplified representation of the payment card of FIG. 2A with the display section depicting a deteriorating health condition of the payment card, in accordance with an example embodiment.
Figure 4B:
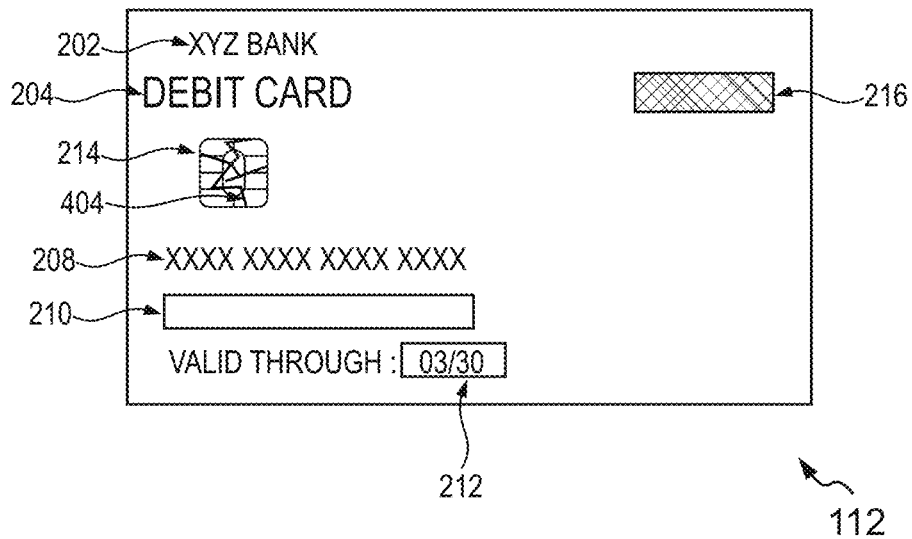
FIG. 4B illustrates a simplified representation of the payment card of FIG. 2A with the display section depicting a bad health condition of the payment card that has suffered physical damage and is rendered unusable, in accordance with yet another example embodiment.

As shown in FIG. 4A, a protective plastic sheath of the payment card 112 has slightly chipped off at an edge (see, 402) due to usage or a storage method of the payment card 112. An interconnection circuit (e.g., the interconnection circuit 254) configured within the payment card 112 detects this physical condition/damage of the payment card 112 and accordingly, a deteriorating health condition of the payment card 112 indicated by a color A is displayed on the display section 216 of the payment card 112. The payment card 112 in FIG. 4B has a crack (see, 404) in the storage chip of the payment card 112 that renders the payment card 112 unusable at any terminal, such as, the merchant terminal 104 or the transaction terminal 118. When the payment card 112 is inserted in the card reader module of the merchant terminal 104, the interconnection circuit configured within the payment card 112 detects the crack and generates a damage signal. The health status is determined based on the damage signal and is indicated as a bad health condition on the display section 216 of the payment card 112. It shall be noted that if the display section 216 is an LCD display, then the display section 216 may display a text message/notification indicating the health status of the payment card 112 for the cardholder 110.

Figure 5A:
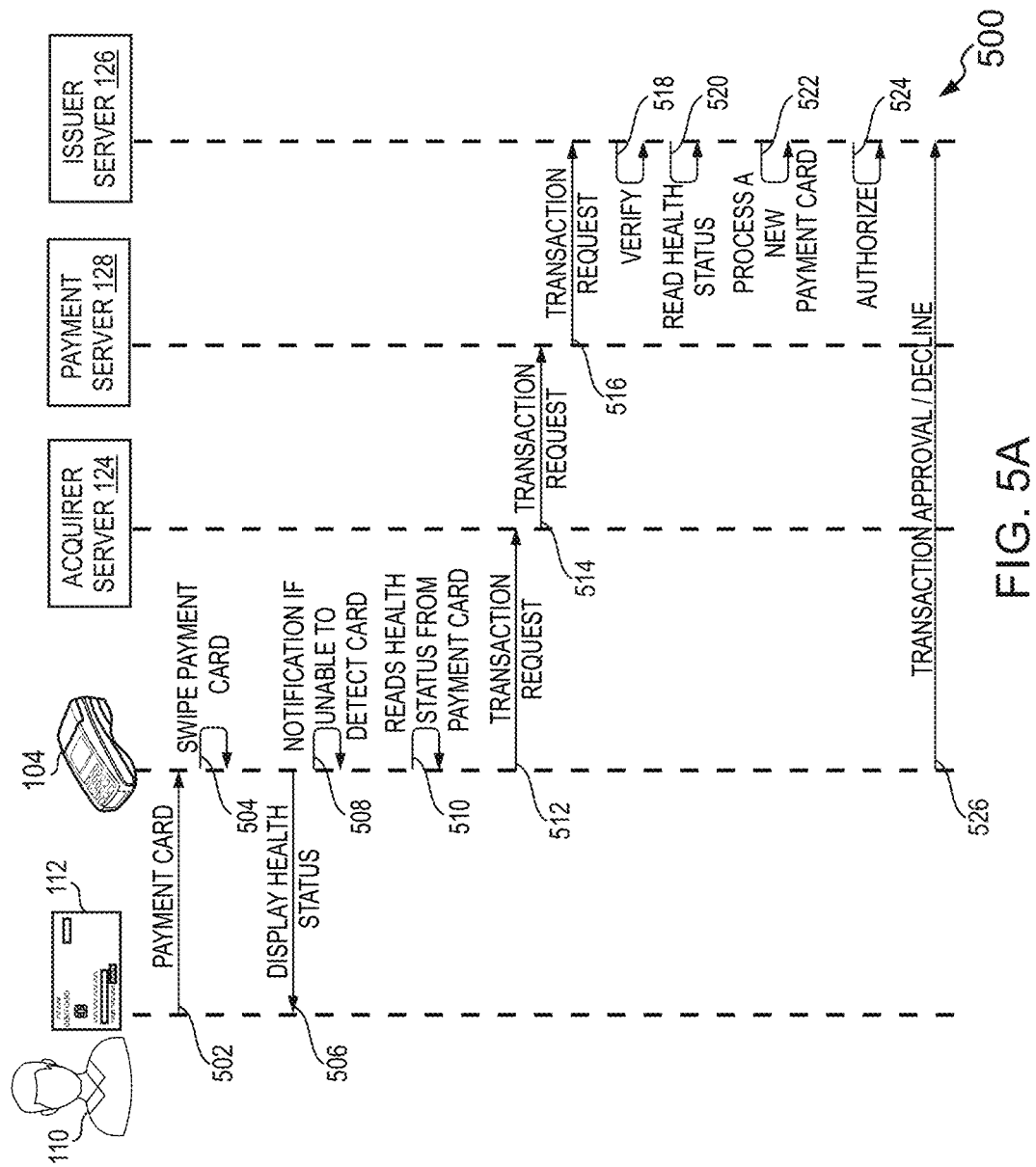
FIG. 5A illustrates a sequence flow diagram representing a method for processing a new payment card based on health status of the payment card of FIG. 2A, in accordance with an example embodiment.

Referring now to FIG. 5A, a sequence flow diagram representing a method 500 for processing a new payment card based on health status of the payment card 112 of FIG. 2A is illustrated in accordance with an example embodiment. The cardholder 110 intends to pay for the goods purchased from the merchant 102 at the merchant terminal 104. In some example embodiment, merchant terminal 104 may also be a payment application facilitated on a computing device, such as, the cardholder device 116 associated with the cardholder 110. The cardholder device 116 may be equipped with sufficient hardware to perform contactless payment, for example, an NFC card reader on the cardholder device 116 may be configured to read the payment card 112 without any physical contact with the payment card 112.

At 502, the cardholder 110 hands over the payment card 112 to the agent 108 to pay for the goods purchased at the merchant 102. At 504, the cardholder 110 initiates a transaction at the merchant terminal 104. The agent 108 at the merchant terminal 104 swipes the payment card 112 at the merchant terminal 104 to read the payment card information. A card reader module in the merchant terminal 104 is configured to read the payment card information of the payment card 112 for the transaction. Additionally, the card reader module also reads a health status of the payment card 112 from the payment card processing section 252, for example, the storage chip 214.

At 506, the payment card 112 displays health status of the payment card 112. When the payment card 112 is inserted into the card reading slot of the POS terminal 104, the payment card 112 is powered ON which activates electrical components housed within the payment card 112 to determine the health status of the payment card 112. Determination of the health status of the payment card 112 is shown and explained with reference to FIG. 2B. The health status of the payment card 112 is displayed on the display section 216 of the payment card 112. In one embodiment, one or more filters in the display section 216 display a color in response to the damage signal generated by the damage sensor 256. For example, a green color indicating a good health condition of the payment card 112. Alternatively, if the payment card 112 has suffered a crack, the display section 216 displays a red color indicating bad health condition of the payment card. The display of a color/change in color on the display section 216 may be triggered by the damage signal which initiates a chemical reaction to change color in the display section 216.

At 508, the merchant terminal 104 displays a message if the merchant terminal is not able to read the payment card 112. For instance, if the payment card 112 is not inserted properly in the card reader module of the POS terminal 104, the POS terminal 104 displays the message for the agent 108/the cardholder 110. In one example scenario, if the payment card 112 is damaged, for example, a crack in the storage chip storing payment card information, then the card reader module of the POS terminal 104 may not be able to read the payment card 112. This also reflects in the display section 216 of the payment card 112 that displays a color indicating bad health condition of the payment card 112.

At 510, the merchant terminal 104 reads the health status of the payment card 112. The health status of the payment card 112 is stored in the storage chip 214. The merchant terminal 104 reads this health status along with the payment card information of the payment card 112.

At 512, the merchant terminal 104 sends a transaction request to the acquirer server 124. The transaction request includes the payment card information, a transaction amount, and the health status of the payment card 112 among other details such as merchant identifier and merchant account details. At 514, the acquirer server 124 forwards the transaction request to the payment server 128. At 516, the payment server 128 forwards the transaction request to the issuer server 126.

At 518, the issuer server 126 verifies the transaction request performed using the payment card 112. For example, the issuer server 126 verifies whether a PIN provided by the cardholder 110 is a correct PIN linked to an associated issuer account of the cardholder 110 for which the payment card 112 was issued to the cardholder 110. The issuer server 126 further checks the account balance of the issuer account and if the account balance is enough to accommodate the transaction amount of the transaction.

At 520, the issuer server 126 reads the health status of the payment card 112. The transaction request includes the health status of the payment card 112 and the issuer server 126 reads the health status to determine if the physical condition of the payment card 112 is good or if it has suffered physical damage. The health status of the payment card 112 enables the issuer server 126 to decide when the issuer has to issue/send a new payment card for the cardholder 110. This provides a good user experience else the cardholder 110 has to raise a request for a new payment card upon determining that the payment card 112 is damaged which may result in a delay of issuing the new payment card for the cardholder 110.

At 522, the issuer server 126 processes a new payment card based on health status of the payment card 112. In at least one example embodiment, the issuer server 126 initiates a new payment card request on behalf of the cardholder 110. The issuer server 126 processes the new payment card request on receiving the health status of the payment card 112 as a deteriorating health condition or bad health condition. In some example embodiments, the issuer server 126 accesses a historical data associated with health status of the payment card 112.

At 524, the issuer server 126 authorizes the transaction request. The issuer server 126 approves the transaction request, and processes the payment from an issuer account of the cardholder 110 to an acquirer account of the merchant 102 via the payment server 128. Details of the transaction from the issuer account to the acquirer account (also referred to as 'a merchant account') are provided as a typical transaction flow known in the art, and are not described herein in detail for the sake of brevity.

At 526, the issuer server 126 sends a transaction approval or decline notification/message to the merchant terminal 104. Additionally or optionally, the issuer server 126 may also send a notification to the cardholder 110 on processing the new payment card request for the cardholder 110 via the cardholder device 116.

Figure 5B:
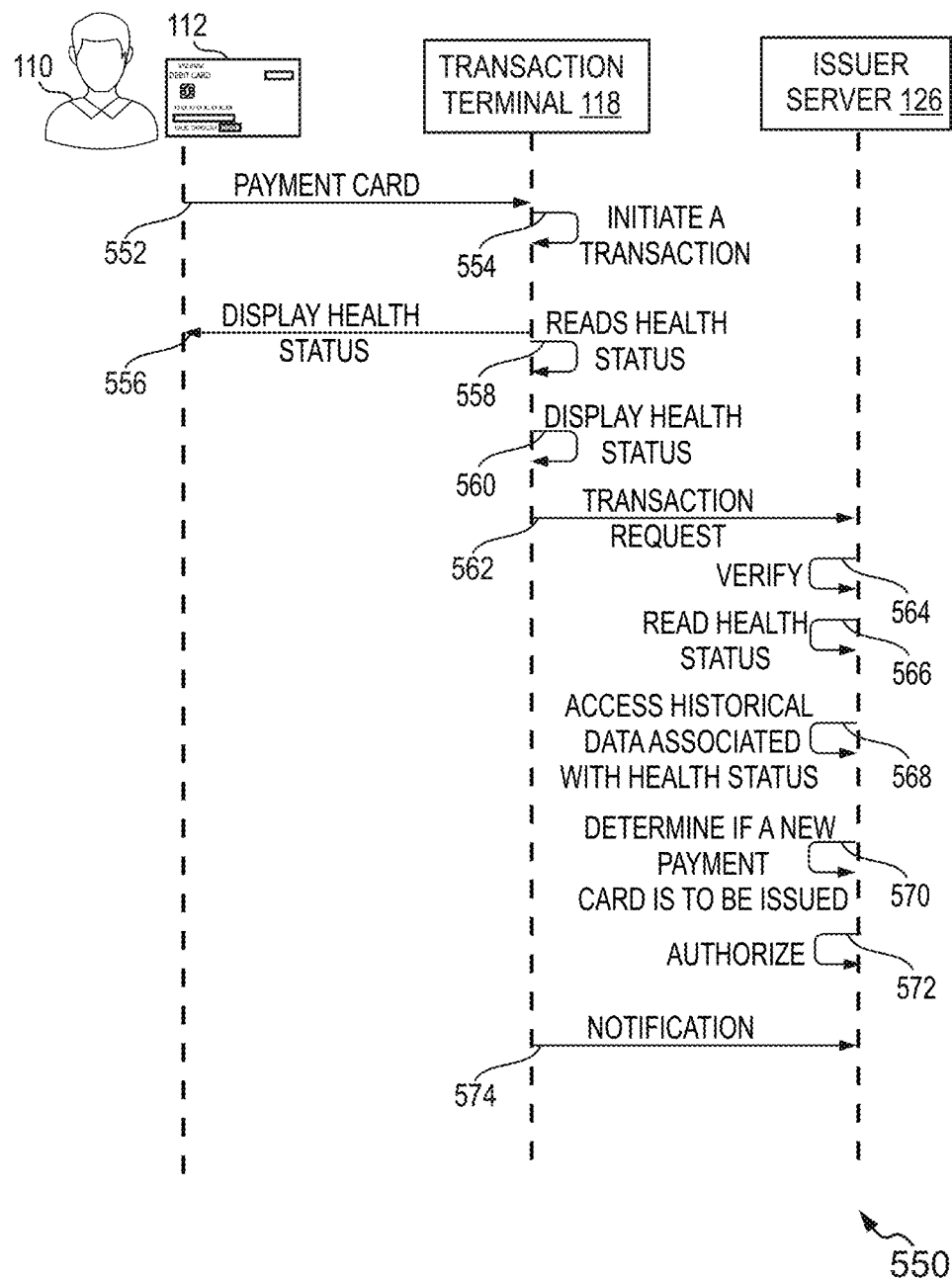
FIG. 5B illustrates a sequence flow diagram representing a method for processing a new payment card based on health status of the payment card of FIG. 2A, in accordance with another example embodiment.

Referring now to FIG. 5B, a sequence flow diagram representing a method 550 for processing a new payment card based on health status of the payment card 112 of FIG. 2A is illustrated in accordance with another example embodiment.

At 552, the cardholder 110 visits the ATM machine 118 to perform a transaction with the payment card 112. For instance, the cardholder 110 visits the ATM machine 118 to withdraw money using the payment card 112. At 554, the cardholder 110 initiates a transaction at the ATM machine 118. The cardholder 110 inserts the payment card 112 in a card reader module of the ATM machine 118 to read the payment card information of the payment.

At 556, the payment card 112 displays health status of the payment card 112. A current health status of the payment card 112 is displayed on the display section 216 (see, FIG. 2A) of the payment card 112. At 558, the ATM machine 118 reads the health status of the payment card 112. At 560, the ATM machine 118 displays the health status of the payment card 112. In some example embodiments, the ATM machine 118 is configured to display a prompt indicating the health status of the payment card 112. The prompt may also provide options for the cardholder 110 to request for a new payment card on displaying a deteriorating health condition or a bad health condition.

At 562, the merchant terminal 104 sends a transaction request to the issuer server 126. The transaction request includes a payment card information, a transaction amount, and the health status of the payment card 112.

At 564, the issuer server 126 verifies the transaction request. The issuer server 126 verifies a PIN provided by the cardholder 110 and if an account balance in the issuer account is enough to accommodate the transaction amount of the transaction. At 566, the issuer server 126 reads the health status of the payment card 112.

At 568, the issuer server 126 accesses historical data associated with health status of the payment card 112. For example, the health status of the payment card 112 for the past 5 transactions may be retrieved by the issuer server 126. Accordingly, the issuer server 126 maintains a table (see, table 700 in FIG. 7A) that manages usage characteristics of the payment card 112. Assuming, a past 5 transactions (P1, P2, P3, P4, P5) are associated with a health status (H1, H2, H3, H4, H5), respectively. In an example scenario, the health status H1, H2, H3, H4 associated with transactions T1, T2, T3, T4 may indicate good health condition and the health status H5 associated with transaction T5 may indicate a deteriorating health condition of the payment card 112.

At 570, the issuer server 126 determines if a new payment card is to be issued for the cardholder 110. In at least one example embodiment, the issuer server 126 either employs predefined rules or mathematical modelling techniques, such as, prediction and determines if the payment card 112 will need a replacement in near future. Accordingly, the issuer server 126 initiates the payment card request based on the historical data associated with the health status of the payment card 112. For instance, as seen in the above example, on analysing the historical data associated with the payment card 112 and usage characteristics of the payment card 112 depicting the deteriorating health condition (H5) shown during transaction T5, the issuer server 126 automatically initiates the new payment card request on behalf of the cardholder 110.

At 572, the issuer server 126 authorizes the transaction request. For instance, in a non-limiting example, upon receiving a correct fixed character length PIN or a fixed character length one-time password (OTP) from the cardholder 110, the cardholder 110 is validated and authenticated by the issuer server 126 and the transaction amount is dispensed via a cash dispensing slot of the ATM machine 118.

At 574, the issuer server 126 sends a transaction approval or decline notification/message to the ATM machine 118. Additionally or optionally, the issuer server 126 may also send a notification to the cardholder 110 on processing the new payment card request for the cardholder 110 on the associated cardholder device 116.

Figure 6A:
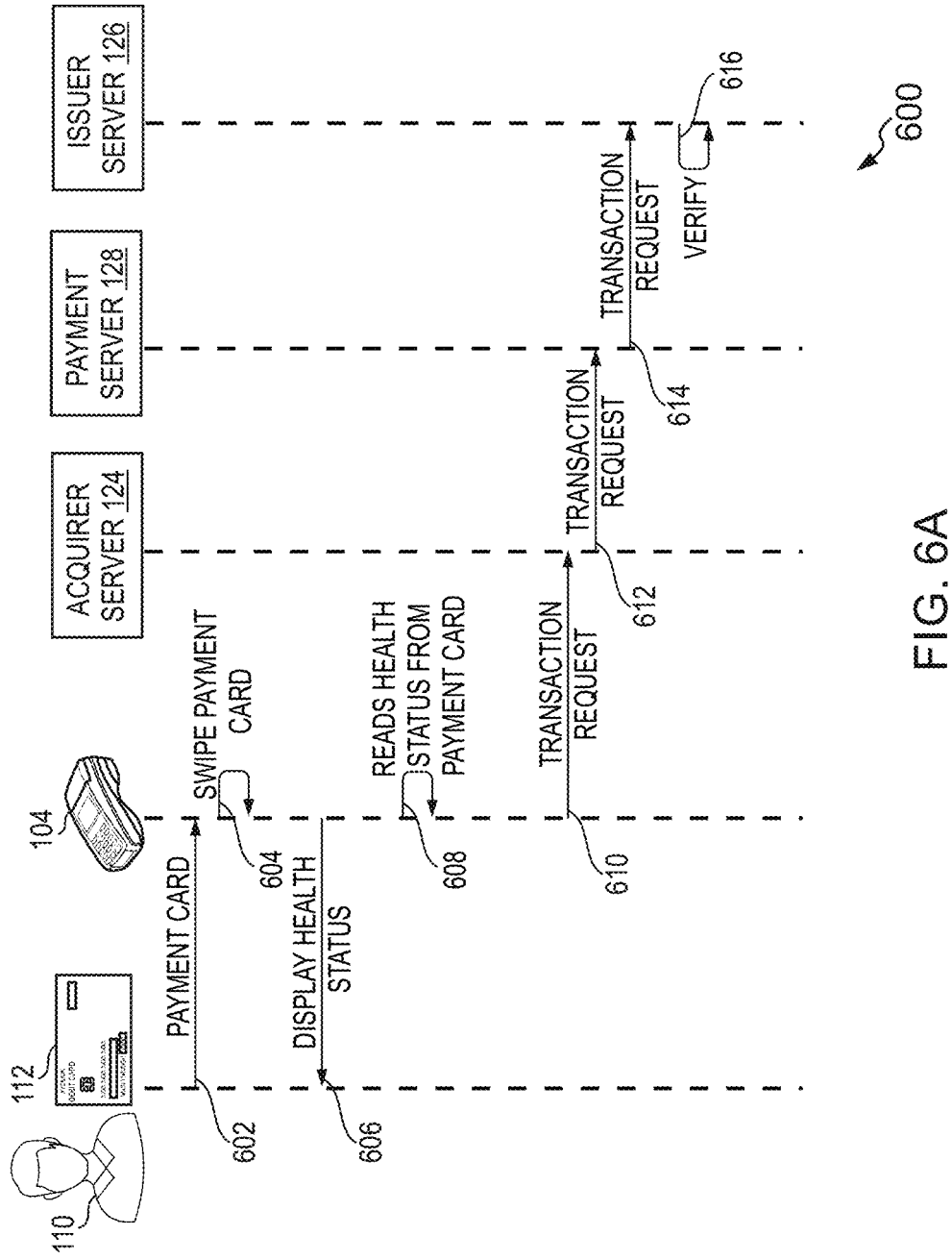
FIGS. 6A-6B, collectively, illustrate a sequence flow diagram representing a method for extending validity time period of the payment card, in accordance with an example embodiment.
Figure 6B:
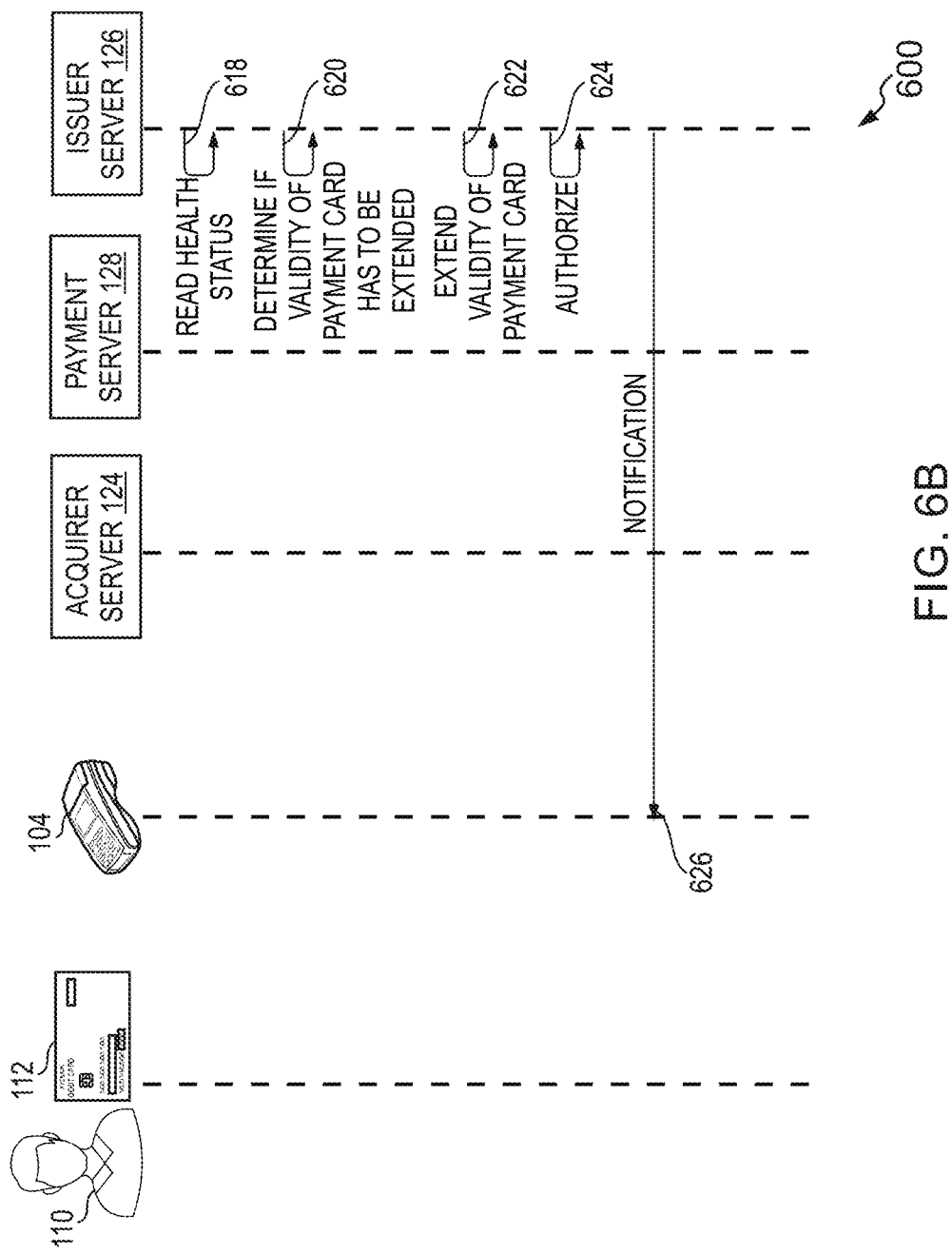

Referring now to FIGS. 6A-6B, a sequence flow diagram representing a method 600 for extending validity time period of the payment card 112 of FIG. 2A is illustrated in accordance with an example embodiment.

At 602, the cardholder 110 hands over the payment card 112 to the agent 108 to pay for the goods purchased at the merchant 102. At 604, the cardholder 110 initiates a transaction at the merchant terminal 104. The agent 108 at the merchant terminal 104 swipes the payment card 112 at the merchant terminal 104 to read the payment card information. A card reader module in the merchant terminal 104 is configured to read the payment card information of the payment card 112 for the transaction. In at least one example embodiment, the payment card information is stored in the payment card processing section 252. More specifically, the payment card information may be stored in the storage chip 214 and/or the magnetic stripe. The payment card information may include cardholder account number, cardholder name, payment card number, and validity information, among others.

At 606, the payment card 112 displays health status of the payment card 112. When the payment card 112 is inserted into the card reader module of the merchant terminal 104, the payment card 112 gets activated. More specifically, electrical components 252, 254, 256, 258, 260 are activated. Determining the health status of the payment card 112 based on physical condition of the payment card 112 has been explained with reference to FIG. 2B. The health status is displayed on the display section 216 of the payment card 112 for the cardholder 110.

At 608, the merchant terminal 104 reads the health status of the payment card 112. At 610, the merchant terminal 104 sends a transaction request to the acquirer server 124. The transaction request includes the payment card information and the health status of the payment card 112. At 612, the acquirer server 124 forwards the transaction request to the payment server 128. At 614, the payment server 128 forwards the transaction request to the issuer server 126.

At 616, the issuer server 126 verifies the transaction request. For example, the issuer server 126 verifies whether a PIN provided by the cardholder 110 is a correct PIN, an account balance of the issuer account is sufficient to accommodate the transaction amount of the transaction, among others. In at least one example embodiment, the issuer server 126 reads the validity information of the payment card 112 for determining if the payment card 112 is a valid card or an invalid card. If the validity of the payment card 112 has expired, the payment card 112 is invalid card and if the validity has not expired, the payment card is a valid card. In an example scenario, if validity of the payment card has expired or is about to expire, for example, in 10 days, the issuer server 126 performs certain steps as listed below.

At 618, the issuer server 126 reads health status of the payment card 112. The issuer server 126 reads the health status of the payment card 112 to determine the physical condition of the payment card 112. More specifically, the issuer server 126 performs a check to determine if the payment card 112 has suffered any physical damage or is worn out due to usage of the payment card 112.

At 620, the issuer server 126 determines if the validity of the payment card 112 has to be extended based on the health status of the payment card 112. In an example scenario, the validity of the payment card 112 may have expired but the payment card 112 may be intact and can be used to perform transactions. Conventionally, the issuer issues a new payment card with a validity for a predefined time. However, this may result in wastage of resources. In at least one example embodiment, the issuer server 126 is configured to extend the validity of the payment card 112 (expired card) by a predefined time. The issuer server 126 on detecting the invalid card, reads the health status of the payment card 112. If the health status of the payment card 112 indicates good health condition, it implies that the payment card 112 has not suffered any physical damage and is still in a usable condition. Alternatively, if the health status indicates either (a) a deteriorating health condition or (b) a bad health condition, the issuer server 126 does not extend the validity of the payment card 112.

At 622, the issuer server 126 extends the validity of the payment card 112 for a predefined time. In one example embodiment, the predefined time may be a fixed time period. For instance, on determining that the health status of the invalid card (payment card 112) is in good condition, the issuer server 126 may extend it by 3 months. In another example embodiment, the issuer server 126 may access usage characteristics of the payment card 112 to perform mathematical modeling, for example, prediction to determine the predefined time. It shall be noted that the issuer server 126 on expiry of the predefined time, may again use the health status to determine if the validity of the payment card has to be extended.

At 624, the issuer server 126 authorizes the transaction request. The issuer server 126 approves the transaction request, and processes the payment from an issuer account of the cardholder 110 to an acquirer account of the merchant 102 via the payment server 128. At 626, the issuer server 126 sends a notification including a transaction approval or decline message to the merchant terminal 104. Additionally or optionally, the issuer server 126 may notify the cardholder 110 of the extension of validity of the payment card 112 via an associated device, for example, the cardholder device 116.

In some example embodiments, operations of the issuer server 126 mentioned above may be performed by the payment server 128.

Referring now to FIG. 7A, a simplified representation of a table 700 maintained at the issuer server 126 for storing usage characteristics of the payment card 112 associated with the cardholder 110 is illustrated in accordance with an example embodiment of the present disclosure. As seen in FIG. 7A, the table 700 includes listings of a cardholder identifier (ID), an associated cardholder name, payment card number, validity information and payment card usage information. The table 700 includes usage information of a plurality of cardholders associated with payment cards issued by an associated issuer. It shall be noted that the table 700 shown in FIG. 7A is exemplary and only provided for the purposes of explanation. In practical, the table 700 may include multiple such tables and each table may have more or less columns and rows than depicted in FIG. 7A.

The table 700 includes columns representing a cardholder ID field 702, a cardholder name field 704, a payment card number field 706, a validity information field 708 and a payment card usage information field 710. The payment card usage information field 710 further includes sub fields, such as, a terminal identifier field 712, a transaction number field 714, and a health status field 716. A row 720 under a column (i.e., the payment card usage information field 710) is divided into a plurality of sub rows that show a plurality of transactions performed with the payment card 112. Moreover, each sub row depicts transaction details performed using the payment card 112 and health status of the payment card 112 while performing a corresponding transaction. As an example, the row 720 depicts that for a cardholder ('Dave') with the cardholder ID "F25/15", an associated payment card is "1234 XXXX XXXX 5678" and is valid up to "November 2020". The cardholder "Dave" has used the payment card (1234 XXXX XXXX 5678) to perform a transaction at terminal ID "MC11" with a transaction number "ABXXX10" and the health status of the payment card was "good health condition" and a last/recent transaction at terminal ID "MC22" with a transaction number "BFXXX41" and the health status of the payment card was "poor health condition". The table 700 includes as many entries as the number of transactions performed by the cardholder 110.

Referring now to FIG. 7B, a simplified representation of a table 750 maintained at the issuer server 126 for storing usage characteristics and validity extension information of the payment card 112 associated with the cardholder 110 is illustrated in accordance with an example embodiment of the present disclosure. As seen in FIG. 7B, the table 750 includes listings of a cardholder identifier (ID), an associated cardholder name, payment card number, validity information and payment card usage information. The table 750 includes usage information and validity extension information of a plurality of cardholders associated with payment cards issued by an associated issuer. It shall be noted that the table 750 shown in FIG. 7B is exemplary and only provided for the purposes of explanation. In practical, the table 750 may include multiple such tables and each table may have more or less columns and rows than depicted in FIG. 7B.

The table 750 includes columns representing a cardholder ID field 752, a cardholder name field 754, a payment card number field 756, a validity information field 758, a payment card usage information field 760, and a validity extension information field 762. The payment card usage information field 760 further includes sub fields, such as, a transaction date field 764, a transaction number field 766, and a health status field 768. A row 770 under a column (i.e., the payment card usage information field 760) is divided into a plurality of sub rows that show a plurality of transactions performed with the payment card 112. Moreover, each sub row depicts transaction details performed using the payment card 112 and health status of the payment card 112 while performing a corresponding transaction. As an example, the row 770 depicts that for a cardholder ('Dave') with the cardholder ID "F25/15", an associated payment card is "1234 XXXX XXXX 5678" and is valid up to "November 2020". The cardholder "Dave" has used the payment card (1234 XXXX XXXX 5678) to perform a number of transactions at different terminals as shown by the payment card usage information field 760. As seen in FIG. 7B, a historical data associated with health status of the payment card (1234 XXXX XXXX 5678) shows a good health condition of the payment card during each transaction. The validity extension information field 762 indicates that the validity of the payment card (1234 XXXX XXXX 5678) was extended by the predefined time of 6 months to "May 2021".

Figure 8:
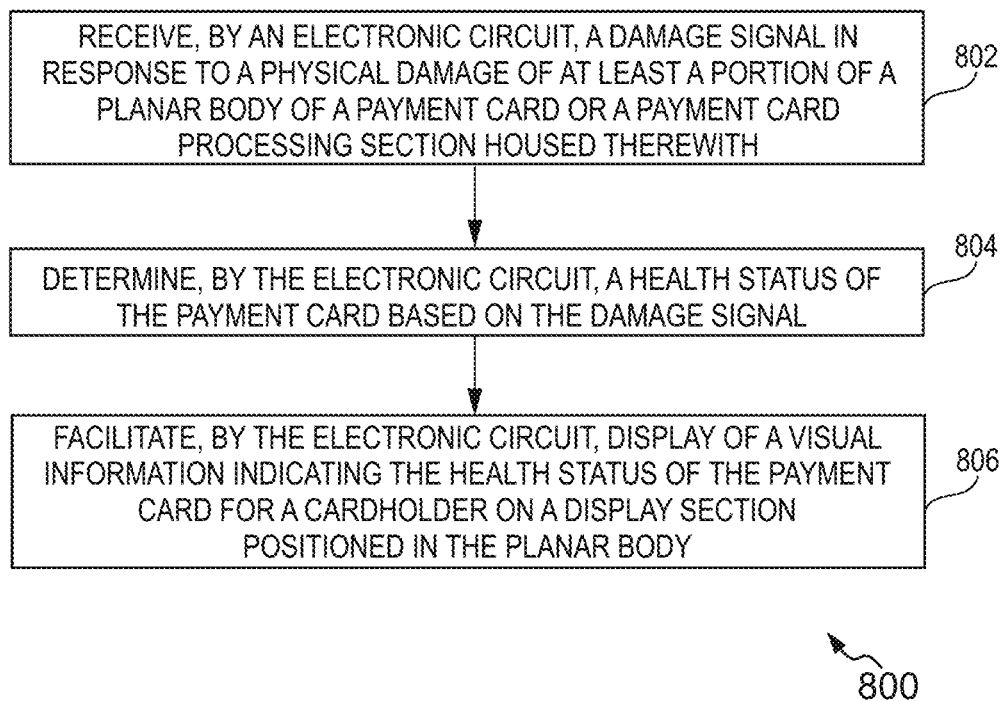
FIG. 8 illustrates a flow diagram of a method for displaying health status of the payment card on a display section of the payment card of FIG. 2A, in accordance with an example embodiment.

FIG. 8 illustrates a flow diagram of a method 800 for displaying health status of the payment card 112 to the cardholder 110, in accordance with an example embodiment. The method 800 depicted in the flow diagram may be executed by, for example, the electronic circuit 258 housed within the planar body of the payment card 112 or a server system associated with the payment network 130. Operations of the flow diagram, and combinations of operation in the flow diagram, may be implemented by, for example, hardware, firmware, a processor, circuitry and/or a different device associated with the execution of software that includes one or more computer program instructions. The operations of the method 800 are described herein with help of the payment card 112 shown and explained with reference to FIG. 2C. It is noted that the operations of the method 800 can be described and/or practiced by using a system other than the electronic circuit 258. The method 800 starts at operation 802.

At operation 802, the method 800 includes receiving a damage signal (D) in response to a physical damage of at least a portion of a planar body of a payment card or a payment card processing section housed therewith. In some example embodiments, an interconnection circuit is configured to detect physical condition of the payment card. For example, one or more electrical components are connected together in a particular fashion such that, a crack or deformation of any portion of the payment card or the payment card processing section, generates the damage signal (D) proportional to the physical damage determined by the interconnection circuit. In at least one example embodiment, the interconnection circuit is configured on at least the payment card processing section and a left corner of the payment card that is inserted into the card reader module of the merchant terminal 104. In an example scenario, a crack in the payment card processing section, for example, a storage chip of the payment card is detected by the interconnection circuit configured on the payment card processing section and accordingly a damage signal (D) proportional to the damage suffered by the storage chip is generated. Assuming, 'n' number of branches of electrical wire are configured along the payment card in a parallel fashion with an input voltage source that receives power from an external power source, for example, the merchant terminal activates the payment card when the payment card is inserted in the card reader module of the merchant terminal. In such a configuration, two branches of electrical wire in a parallel connection are configured to detect any physical damage on the storage chip, and one wire suffers a damage due to the physical damage of the storage chip, the electrical circuit has a discontinuity, and an output voltage may change to reflect this discontinuity. The damage signal (D) may reflect a change in the output voltage of the interconnection circuit. Determining physical damage in any part of the payment card is shown and explained with reference to FIGS. 2C-2F.

At operation 804, the method 800 includes determining a health status of the payment card based on the damage signal (D). In at least some example embodiments, the damage signal (D) is compared with at least a first threshold ($T_1$) and a second threshold ($T_2$) to determine health status of the payment card.
 (a) If the damage signal (D) is less than the first threshold ($D<T_1$), the physical damage suffered by the payment card is insignificant. This indicates that the payment card is in a good health condition.
 (b) If the damage signal (D) is greater than the first threshold but less than the second threshold ($T1<D<T_2$), the health status of the payment card is determined as a deteriorating health condition.
 (c) If the damage signal (D) is greater than the second threshold ($D>T_2$), the health status of the payment card is determined as a bad health condition.

At operation 806, the method 800 includes facilitating display of a visual information indicating the health status of the payment card for a cardholder on a display section positioned in the planar body. When the payment card is inserted in the card reader module of the merchant terminal, the payment card is activated and the display section (see, 216 in FIG. 2A) displays a color in response to the damage signal (D). More specifically, one or more color filters in the display section initiate a chemical reaction that displays a color associated with the health status of the payment card.

The sequence of operations of the method 800 need not be necessarily executed in the same order as they are presented. Further, one or more operations may be grouped together and performed in form of a single step, or one operation may have several sub-steps that may be performed in parallel or in sequential manner.

Figure 9:
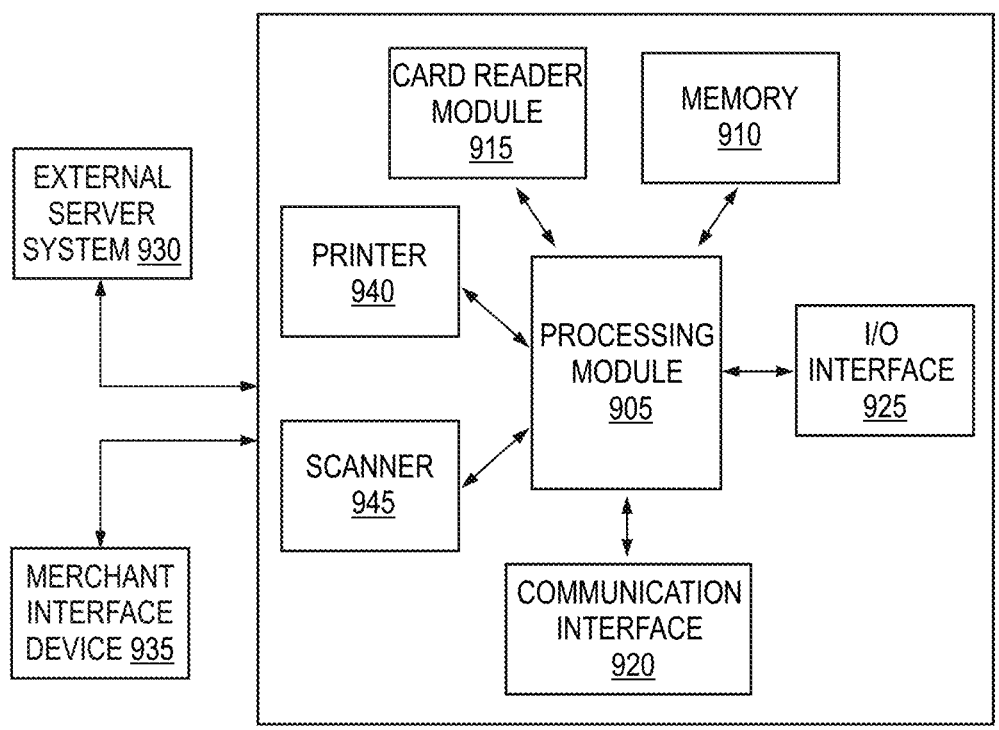
FIG. 9 is a simplified block diagram of a POS terminal of a merchant used for displaying a health status of a payment card, in accordance with an example embodiment.

FIG. 9 is a simplified block diagram of a merchant terminal 900 of a merchant (e.g., the merchant 102) for displaying health status of a payment card, in accordance with an embodiment of the present disclosure. The term 'merchant terminal' 900 (also referred to as a 'POS terminal 900') may refer to a system including a host computer connected to several peripheral devices, such as a keyboard, and a mouse, a card reader, a barcode scanner, a receipt printer, a cash drawer, and a weighing scale. However, it shall be noted that herein the POS terminal 900 is referred to the POS machine which is used to swipe payment cards.

The POS terminal 900 includes at least one processing module 905 communicably coupled to a memory 910, a card reader module 915, a communication interface 920, and a printer 940. The components of the POS terminal 900 provided herein may not be exhaustive, and that the POS terminal 900 may include more or fewer components than those depicted in FIG. 9. Further, two or more components may be embodied in one single component, and/or one component may be configured using multiple sub-components to achieve the desired functionalities. Some components of the POS terminal 900 may be configured using hardware elements, software elements, firmware elements and/or a combination thereof.

The card reader module 915 runs scripts such as or similar to EMV scripts (GET scripts) that allow reading of information from a chip of a payment card (e.g., the payment card 112). In some example embodiments, the card reader module 915 is configured to read health status of payment cards, for example, payment card 112. The health status information may be stored in the chip of the payment card. In at least one example embodiment, the card reader module 915 is configured to read the health status of the payment card from a display section of the payment card (see, the display section 216 of FIG. 2A). The card reader module 915 is also configured to read information stored within magnetic stripes provided in some payment cards. There may be as many as two card reader modules in the POS terminal 900 that each of which may be configured to read information stored in different types of storages, such as chips and magnetic stripes.

An I/O interface 925 is configured to receive inputs from an end-user and provide outputs to the end-user (i.e., the agent 108 and/or the cardholder 110) of the POS terminal 900. For instance, the I/O interface 925 may include at least one input interface and/or at least one output interface. Examples of the input interface may include, but are not limited to, a keyboard, a keypad, a touch screen, soft keys, and the like. The input interface (also referred to as 'input module') may be used to provide transaction amount, and a PIN. Examples of the output interface may include, but are not limited to, a UI display (such as a light emitting diode display, a thin-film transistor (TFT) display, a liquid crystal display, an active-matrix organic light-emitting diode (AMOLED) display, etc.) and the like. The output interface (also referred to as 'output module') may be used to display transaction details, health status of the payment card, a validity extension information or processing of a new payment card for the cardholder (e.g., the cardholder 110). Further, the output interface may optionally display a notification depicting payment transaction status such as, payment transaction approval or decline upon transferring the transaction amount to an acquirer account of the merchant.

The printer 940 is configured to print receipts of the transaction. The receipt includes an acquirer bank name, the transaction amount, merchant name, date on which the receipt is printed and a payment card type, among other information. In some example embodiments, the receipt may also print the health status of the payment card.

The memory 910 can be any type of storage accessible to the processing module 905. For example, the memory 910 may include volatile or non-volatile memories, or a combination thereof. In some non-limiting examples, the memory 910 can be four to sixty-four Megabytes (MB) of Dynamic Random Access Memory ("DRAM") or Static Random Access Memory ("SRAM"). In addition, some examples may include supplementary flash memory installed via a PCMCIA slot. Moreover, the memory 910 is capable of storing and/or retrieving data, such as, but not limited to, smart card insertions, user/customer information, merchant information, card swipes, touch-screen key depressions, keypad key depressions, number of dots printed by the slip and roll printers, check read errors, and the like. Such information can be accessed by the processing module 905 using the communication interface 920 to determine potential future failures and the like.

The POS terminal 900 is capable of communicating with one or more POS peripheral devices such as a merchant interface device 935 and an external server system 930 such as the acquirer server 124 (shown in FIG. 1) via the communication interface 920 over a communication network (not shown). The merchant interface device 935 can provide functionality which is used by a consumer (e.g., the cardholder 110) at a merchant facility (e.g., the merchant 102), such as unique reference code (e.g., QR code) entry corresponding to the payment card of the cardholder 110, PIN entry, clear text entry, signature capture, and the like. The POS terminal 900 includes a scanner 945 configured to read a machine-readable encrypted code. The scanner 945 may be a barcode scanner or a QR code scanner. The merchant interface device 935 may be connected to several peripheral devices including cash drawers, receipt printers, PIN pads, signature capture devices and the like. In some embodiments, the merchant interface device 935 may be mounted near a cash register at a check-out counter at a merchant facility, while the POS terminal 900 may be mounted on the check-out counter such that it is accessible to customers. In this way, both the merchant and the user/customer can interact with similar devices to process the payment transaction.

The communication interface 920 is further configured to cause display of one or more user interfaces on the POS terminal 900 for receiving user input from an agent (e.g., the agent 108) operating the POS terminal 900 such as to process a transaction between the cardholder 110 and the merchant 102. In one embodiment, the communication interface 920 includes a transceiver for wirelessly communicating information (transaction amount, merchant identifier, etc.) to, or receiving information from, the external server system 930 or other suitable display device, and/or another type of remote processing device. In another embodiment, the communication interface 920 is capable of facilitating operative communication with the remote devices and a cloud server using Application Program Interface (API) calls. The communication may be achieved over a communication network.

The processing module 905 is capable of sending the payment transaction request received from the end-user via the communication interface 920 to the external server system 930 for processing the transaction. For example, the processing module 905 is configured to receive the PIN, the transaction amount using the UIs and optionally the health status of the payment card. The processing module 905 can access the memory 910 to retrieve the merchant information of the merchant 102 such as, merchant identifier merchant account details that are required to be sent along with the transaction request to the external server system 930. Further, the processing module 905 is caused to append the health status of the payment card along with the transaction request.

Additionally, the POS terminal 900 can include an operating system and various software applications that can provide various functionalities to the POS terminal 900. For example, in some embodiments, the POS terminal 900 is addressable with an Internet protocol and includes an application. In such embodiments, the processing module 905 includes software adapted to support such functionality. In some embodiments, the processing module 905 executes software to support network management. In particular, this capacity allows software to be downloaded to a plurality of such systems to provide new applications such as application for various possible payment methods using POS terminals and/or updates to existing applications. The operating system and software application upgrades are distributed and maintained through communication to the POS terminal 900 over the payment network 130.

It will be appreciated that many functionalities of the merchant terminal 900 can be performed by user devices such as, mobile phones or server systems or a combination thereof.

Figure 10:
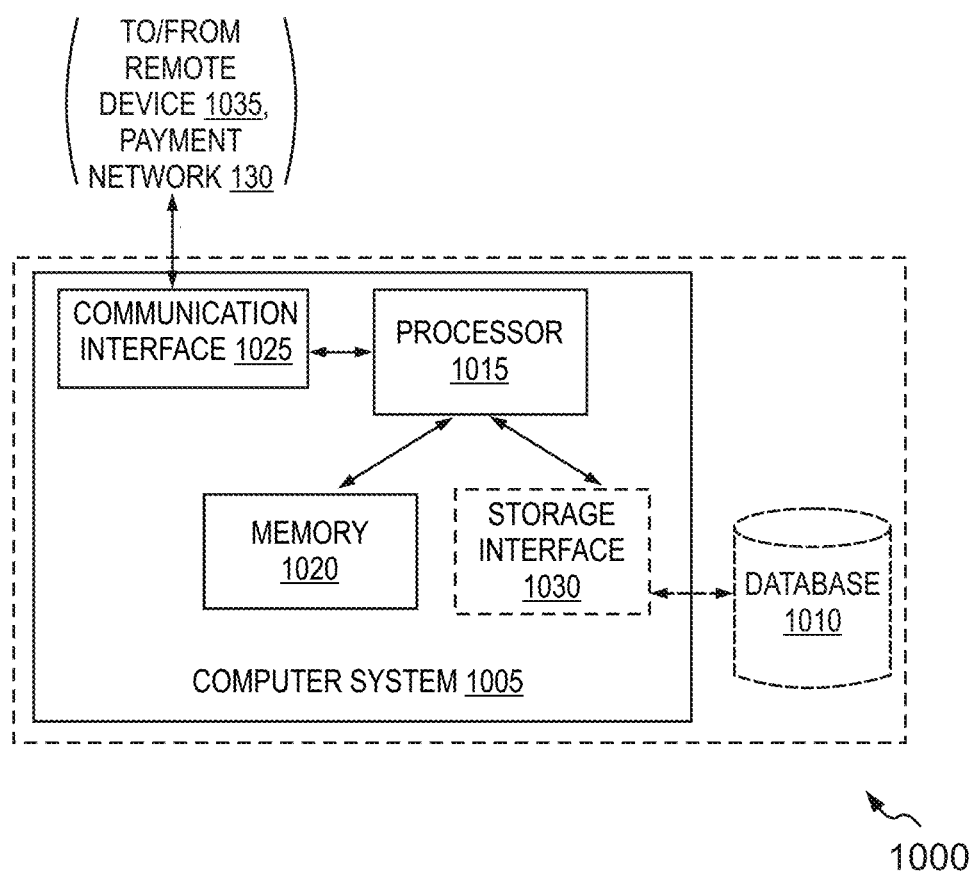
FIG. 10 is a simplified block diagram of a server system for processing a payment card request based on a health status of a payment card, in accordance with an example embodiment.

FIG. 10 is a simplified block diagram of a server system 1000 for processing a payment card request based on a health status of a payment card. Examples of the server system 1000 include, but are not limited to, the acquirer server 124, the payment server 128 and the issuer server 126 illustrated in FIG. 1. The server system 1000 includes a computer system 1005 and a database 1010. The computer system 1005 includes at least one processor 1015 for executing instructions. Instructions may be stored in, for example, but not limited to, a memory 1020. The processor 1015 may include one or more processing units (e.g., in a multi-core configuration).

The processor 1015 is operatively coupled to a communication interface 1025 such that the computer system 1005 is capable of communicating with a remote device 1035, such as, a merchant terminal (e.g., the merchant terminal 104) or communicating with any entity within the payment network 130. For example, the communication interface 1025 may receive the transaction request for processing a transaction received from the merchant terminal (e.g., the merchant terminal 104).

The processor 1015 may also be operatively coupled to the database 1010. The database 1010 is any computer-operated hardware suitable for storing and/or retrieving data, such as, but not limited to, transaction data generated as part of sales activities conducted over the bankcard network including data relating to merchants, account holders or customers, and purchases. The database 1010 may also store information related to a plurality of user's issuer accounts. Each user account data includes at least one of a cardholder name, a cardholder address, an account number, MPIN, and other account identifier. Further, the database 1010 may also store usage information of a plurality of payment cards associated with a plurality of cardholders. The usage information may include transaction history, health status of the payment card for each transaction (also referred to as 'historical data associated with health status of the payment card') and validity extension information, among others. The database 1010 also includes instructions for settling transactions between issuer account and merchant account including merchant bank account information. The database 1010 may include multiple storage units such as hard disks and/or solid-state disks in a redundant array of inexpensive disks (RAID) configuration. The database 1010 may include a storage area network (SAN) and/or a network attached storage (NAS) system.

In some embodiments, the database 1010 is integrated within the computer system 1005. For example, the computer system 1005 may include one or more hard disk drives as the database 1010. In other embodiments, the database 1010 is external to the computer system 1005 and may be accessed by the computer system 1005 using a storage interface 1030. The storage interface 1030 is any component capable of providing the processor 1015 with access to the database 1010. The storage interface 1030 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1015 with access to the database 1010.

The processor 1015 is configured to facilitate a transaction from an issuer account to an acquirer account (merchant account). The processor 1015 is configured to perform one or more functions such as: receive the transaction request, authenticate the transaction, read the health status, determine if a new payment card has to be issued for the cardholder based on the health status, determine if the payment card is a valid card or an invalid card, extend validity of an invalid payment card based on health status of the payment card and notify the cardholder about a status of the transaction. Thereafter, the processor 1015 is configured to facilitate the transaction from the issuer account of the cardholder 110 to the acquirer account of the merchant 102. The processor 1015 may also be configured to notify the cardholder 110 of the transaction status in an electronic device (e.g., the cardholder device 116) via the communication interface 1025.

Figure 11:
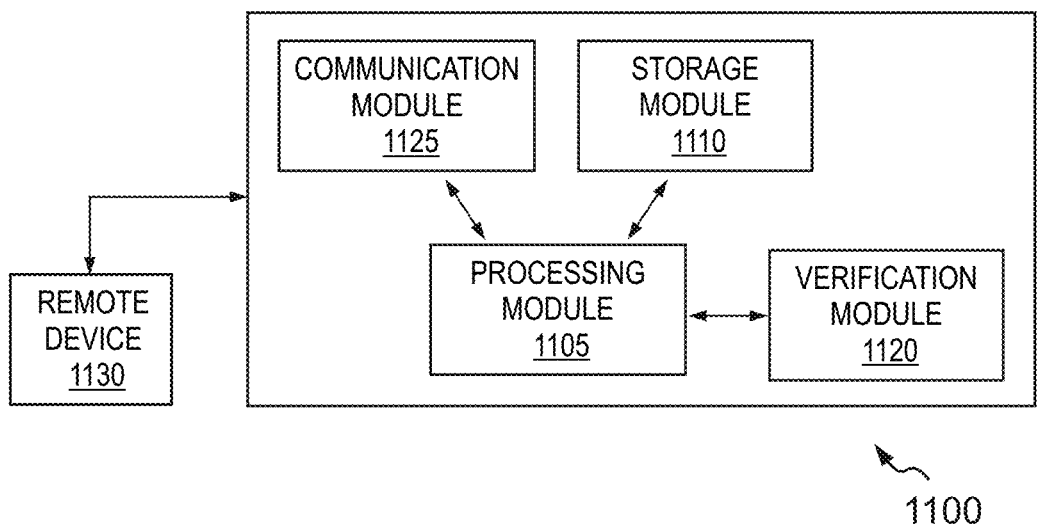
FIG. 11 is a simplified block diagram of an issuer server used for processing a payment card request based on a health status of a payment card, in accordance with an example embodiment.

FIG. 11 is a simplified block diagram of an issuer server 1100, in accordance with one embodiment of the present disclosure. The issuer server 1100 is an example of the issuer server 126 of FIG. 1 or may be embodied in the issuer server 126. The issuer server 1100 is associated with an issuer bank/issuer, in which a cardholder may have an account, which provides a payment card (e.g., the payment card 112). The issuer server 1100 includes a processing module 1105 operatively coupled to a storage module 1110, a verification module 1120 and a communication module 1125. The components of the issuer server 1100 provided herein may not be exhaustive and the issuer server 1100 may include more or fewer components than those depicted in FIG. 11. Further, two or more components may be embodied in one single component, and/or one component may be configured using multiple sub-components to achieve the desired functionalities. Some components of the issuer server 1100 may be configured using hardware elements, software elements, firmware elements and/or a combination thereof.

The storage module 1110 is configured to store machine executable instructions to be accessed by the processing module 1105. Additionally, the storage module 1110 stores information related to, contact information of the customer, bank account number, availability of funds in the account, payment card details, travel information of customers, transaction history, historical data associated with health status of payment cards, validity extension information of payment cards and/or the like. This information is retrieved by the processing module 1105 for validation during machine-readable script generation.

The processing module 1105 is configured to communicate with one or more remote devices such as a remote device 1130 using the communication module 1125 over a network such as the payment network 130 of FIG. 1. The examples of the remote device 1130 include the merchant terminal 104, the transaction terminal 118, the payment server 128, the acquirer server 124 and/or other computing systems of the payment network 130 and the like. The communication module 1125 is capable of facilitating such operative communication with the remote devices and cloud servers using API (Application Program Interface) calls. The communication module 1125 is configured to receive the transaction request for processing the transaction and a health status of the payment card.

The verification module 1120 is configured to verify and validate a customer (such as the cardholder 110), the payment card 112 associated with the cardholder 110 and a PIN of the payment card for approving the transaction. Further, the verification module 1120 determines if the validity of the payment card has expired based on a validity information of the payment card. The verification module 1120 may also verify if an issuer account of the customer associated with the payment card has a good standing balance. The processing module 1105 is configured to perform one or more functions, for example, processing a payment card request for a new payment card on reading health status of a payment card as deteriorating/bad health condition, determining a predefined time based on health status of the payment card, and extending the validity of the payment card based on the predefined time. The communication module 1125 is configured to send notification of approval or decline of a transaction, notification indicating processing of a new payment card, and validity extension information to the merchant terminal 104/transaction terminal 118 via the payment network 130.

Figure 12:
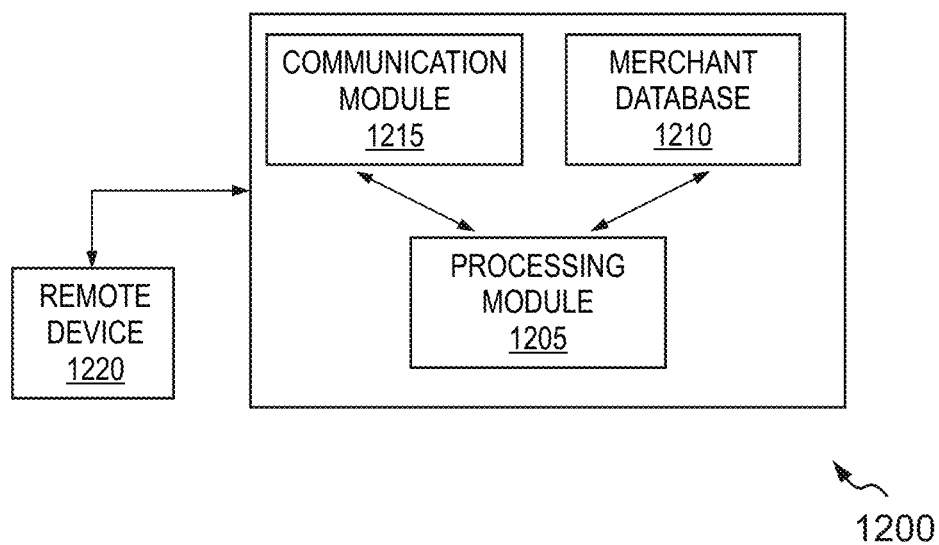
FIG. 12 is a simplified block diagram of an acquirer server used for facilitating transactions at a merchant terminal, in accordance with an example embodiment.

FIG. 12 is a simplified block diagram of an acquirer server 1200 used for facilitating transactions performed using the payment card 112 via the merchant terminal 104, in accordance with one embodiment of the present disclosure. The acquirer server 1200 is associated with an acquirer bank, which may be associated with a merchant (e.g., the merchant facility 102) at whose facility the cardholder 110 is purchasing goods. The merchant may have established an account to accept payment for purchase of goods from customers. The acquirer server 1200 is an example of the acquirer server 124 of FIG. 1 or may be embodied in the acquirer server 124. Further, the acquirer server 1200 is configured to facilitate transactions with the issuer server 126 using the payment network 130 of FIG. 1. The acquirer server 1200 includes a processing module 1205 communicably coupled to a merchant database 1210 and a communication module 1215. The communication module 1215 is configured to receive the transaction request from the merchant terminal 104 and forward the transaction request to the payment server 128 or the issuer server 126 associated with the payment network 130.

The components of the acquirer server 1200 provided herein may not be exhaustive, and that the acquirer server 1200 may include more or fewer components than those depicted in FIG. 12. Further, two or more components may be embodied in one single component, and/or one component may be configured using multiple sub-components to achieve the desired functionalities. Some components of the acquirer server 1200 may be configured using hardware elements, software elements, firmware elements and/or a combination thereof.

The merchant database 1210 includes a table which stores one or more merchant parameters, such as, but not limited to, a merchant primary account number (PAN), a merchant name, a merchant ID (MID), a merchant category code (MCC), a merchant city, a merchant postal code, an MAID, a merchant brand name, terminal identification numbers (TIDs) associated with merchant terminals (e.g., the POS terminals or any other merchant electronic devices) used for processing transactions, among others. The processing module 1205 is configured to use the MID or any other merchant parameter such as the merchant PAN to identify the merchant during the normal processing of payment transactions, adjustments, chargebacks, end-of-month fees, loyalty programs associated with the merchant and so forth. The processing module 1205 may be configured to store and update the merchant parameters in the merchant database 1210 for later retrieval. In an embodiment, the communication module 1215 is capable of facilitating operative communication with a remote device 1220 such as, the merchant terminal 104.

Figure 13:
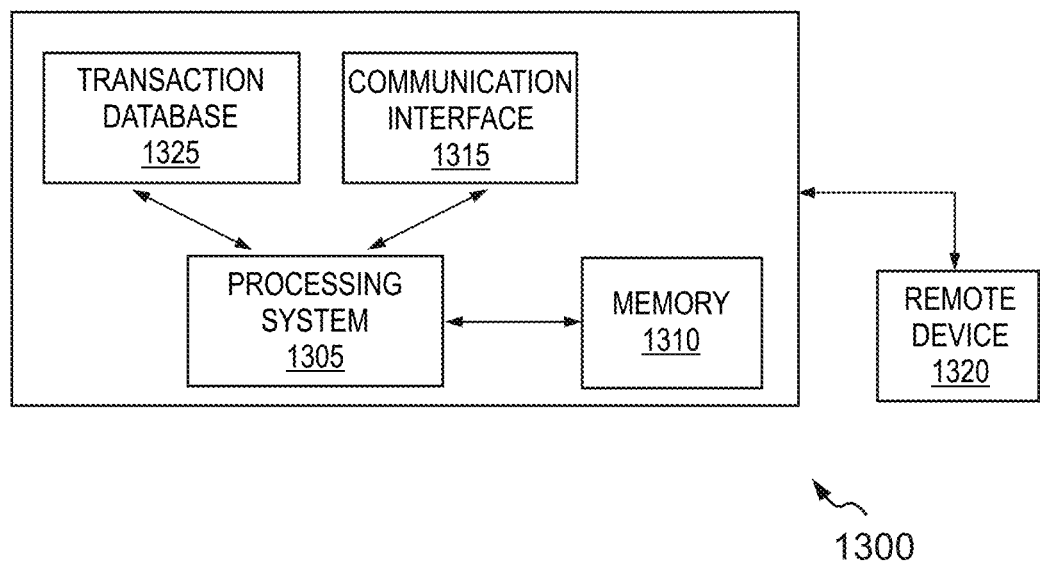
FIG. 13 is a simplified block diagram of a payment server used for facilitating transactions, in accordance with an example embodiment.

FIG. 13 is a simplified block diagram of a payment server 1300 used for facilitating transactions performed using the payment card via the merchant terminal, in accordance with an embodiment of the present disclosure. The payment server 1300 is an example of the payment server 128 of FIG. 1. The payment network 130 may be used by the payment server 1300, the issuer server 1100 and the acquirer server 1200 as a payment interchange network. The payment server 1300 includes a processing system 1305 configured to extract programming instructions from a memory 1310 to provide various features of the present disclosure. The components of the payment server 1300 provided herein may not be exhaustive and the payment server 1300 may include more or fewer components than those depicted in FIG. 13. Further, two or more components may be embodied in one single component, and/or one component may be configured using multiple sub-components to achieve the desired functionalities. Some components of the payment server 1300 may be configured using hardware elements, software elements, firmware elements and/or a combination thereof.

Via a communication interface 1315, the processing system 1305 receives request from a remote device 1320 such as the acquirer server 1200. The request may be a transaction request from the acquirer server 1200. The communication may be achieved through API calls, without loss of generality. The payment server 1300 includes a database, such as a transaction database 1325. The transaction database 1325 may include transaction processing data, such as Issuer ID, country code, acquirer ID, among others. In addition, the processing system 1305 may store information of the merchant 102 and the cardholder 110.

Figure 14:
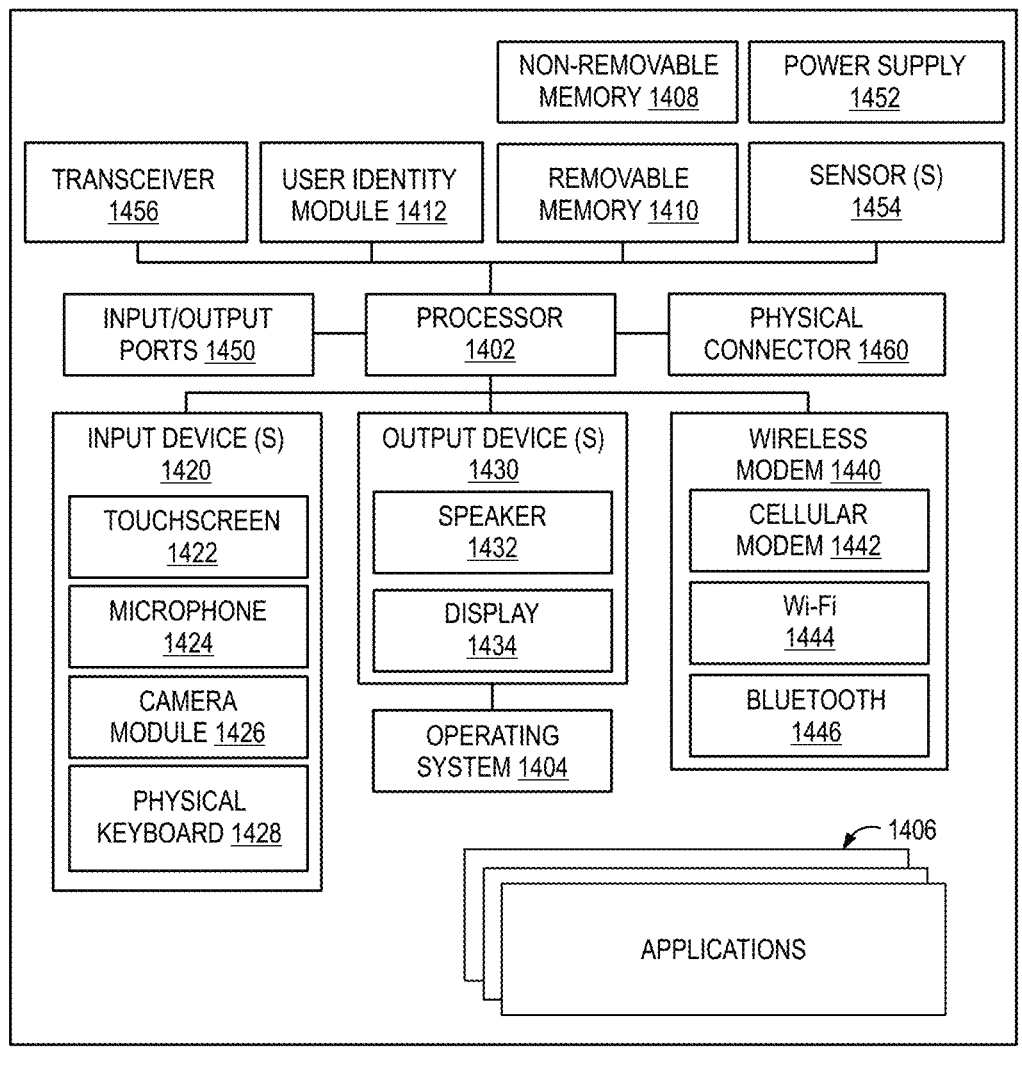
FIG. 14 shows simplified block diagram of an electronic device, for example, a mobile phone capable of implementing the various embodiments of the present disclosure.

FIG. 14 shows simplified block diagram of an electronic device 1400, for example, a mobile phone capable of implementing at least some embodiments of the present disclosure. The electronic device 1400 is depicted to include one or more applications 1406. The electronic device 1400 is an example of the cardholder device 116.

It should be understood that the electronic device 1400 as illustrated and hereinafter described is merely illustrative of one type of device and should not be taken to limit the scope of the embodiments. As such, it should be appreciated that at least some of the components described below in connection with the electronic device 1400 may be optional and thus in an example embodiment may include more, fewer, or different components than those described in connection with the example embodiment of the FIG. 14. As such, among other examples, the electronic device 1400 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1400 includes a controller or a processor 1402 (e.g., a signal processor, microprocessor, ASIC, or other control and processing logic circuitry) for performing such tasks as signal coding, data processing, image processing, input/output processing, power control, and/or other functions. An operating system 1404 controls the allocation and usage of the components of the electronic device 1400 and support for one or more applications programs (see, the applications 1406), such as a payment application for managing payment cards of a customer (e.g., the cardholder 110). In addition to the application interface, the applications 1406 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 1400 includes one or more memory components, for example, a non-removable memory 1408 and/or a removable memory 1410. The non-removable memory 1408 and/or the removable memory 1410 may be collectively known as database in an embodiment. The non-removable memory 1408 can include RAM, ROM, flash memory, a hard disk, or other well-known memory storage technologies. The removable memory 1410 can include flash memory, smart cards, or a Subscriber Identity Module (SIM). The one or more memory components can be used for storing data and/or code for running the operating system 1404 and the applications 1406. The electronic device 1400 may further include a user identity module (UIM) 1412. The UIM 1412 may be a memory device having a processor built in. The UIM 1412 may include, for example, a subscriber identity module (SIM), a universal integrated circuit card (UICC), a universal subscriber identity module (USIM), a removable user identity module (R-UIM), or any other smart card. The UIM 1412 typically stores information elements related to a mobile subscriber. The UIM 1412 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1400 can support one or more input devices 1420 and one or more output devices 1430. Examples of the input devices 1420 may include, but are not limited to, a touch screen/a screen 1422 (e.g., capable of capturing finger tap inputs, finger gesture inputs, multi-finger tap inputs, multi-finger gesture inputs, or keystroke inputs from a virtual keyboard or keypad), a microphone 1424 (e.g., capable of capturing voice input), a camera module 1426 (e.g., capable of capturing still picture images and/or video images) and a physical keyboard 1428. Examples of the output devices 1430 may include, but are not limited to a speaker 1432 and a display 1434. Other possible output devices can include piezoelectric or other haptic output devices. Some devices can serve more than one input/output function. For example, the touch screen 1422 and the display 1434 can be combined into a single input/output device.

A wireless modem 1440 can be coupled to one or more antennas (not shown in the FIG. 14) and can support two-way communications between the processor 1402 and external devices, as is well understood in the art. The wireless modem 1440 is shown generically and can include, for example, a cellular modem 1442 for communicating at long range with the mobile communication network, a Wi-Fi compatible modem 1444 for communicating at short range with an external Bluetooth-equipped device or a local wireless data network or router, and/or a Bluetooth-compatible modem 1446. The wireless modem 1440 is typically configured for communication with one or more cellular networks, such as a GSM network for data and voice communications within a single cellular network, between cellular networks, or between the electronic device 1400 and a public switched telephone network (PSTN).

The electronic device 1400 can further include one or more input/output ports 1450 for establishing connection with peripheral devices including the POS terminal 900, a power supply 1452, one or more sensors 1454 for example, an accelerometer, a gyroscope, a compass, or an infrared proximity sensor for detecting the orientation or motion of the electronic device 1400 and biometric sensors for scanning biometric identity of an authorized user, a transceiver 1456 (for wirelessly transmitting analog or digital signals) and/or a physical connector 1460, which can be a USB port, IEEE 1294 (FireWire) port, and/or RS-232 port. The illustrated components are not required or all-inclusive, as any of the components shown can be deleted and other components can be added.

With the application (see, the applications 1406) and/or other software or hardware components, the electronic device 1400 can implement the technologies described herein. For example, the processor 1402 can read a payment card (e.g., the payment card 112) to determine payment card information and/or health status of the payment card, initiate payment card request for a new payment card, initiate a validity extension request for extending validity of the payment card and displaying notifications of transaction status.

Without in any way limiting the scope, interpretation, or application of the claims appearing below, a technical effect of one or more of the example embodiments disclosed herein is to provide a user-friendly experience for the cardholder while using a payment card to perform transactions at terminals. Various embodiments provide methods and systems for displaying health status of the payment card to a cardholder and thereby making the cardholder aware of the physical condition of the payment card. The payment card displays the health status to indicate if the payment card has suffered any physical damage and/or if the payment card is in a condition to perform a transaction. Moreover, an issuer server associated with the payment card initiates a request for processing a new payment card based on the health status of the payment card thereby precluding hassles of the cardholder visiting the issuing bank or manually initiating a request for a new payment card. This also mitigates and avoids confusion of the cardholder when the merchant terminal fails to read the payment card or displays an error message. Furthermore, the health status information of the payment card may be used to automatically extend validity of the payment card upon expiry. This ensures reusability and reduces wastage of mandatorily getting a new payment card upon expiry of validity of the payment card even though the payment card is intact.

The disclosed methods with reference to FIGS. 1 to 14, or one or more operations of the flow diagram 800 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1000 (e.g., the servers 124, 126 and 128) and its various components such as the computer system 1005 and the database 1010 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A payment card, comprising:
   a planar body housing a payment card processing section;
   an interconnection circuit configured within the planar body, the interconnection circuit configured to generate a damage signal in response to a physical damage of at least a portion of the planar body or the payment card processing section;
   a display section positioned in the planar body for displaying a visual information indicating health status of the payment card in response to the damage signal for a cardholder; and
   an electronic circuit in operative communication with the payment card processing section, the electronic circuit configured to determine the health status of the payment card; and
   wherein the payment card processing section is configured to send a transaction request to a server system associated with a payment network via a terminal, the transaction request comprising at least a payment card information, the health status of the payment card and a validity information, wherein upon receipt of the transaction request, the server system is configured to perform:
   reading the health status of the payment card; and
   upon determining the health status as at least one of a deteriorating health condition or a bad health condition, processing a new payment card request for the cardholder.

2. The payment card as claimed in claim 1, wherein the payment card processing section is further configured to perform:
   establishing a connection with the terminal for performing a transaction;
   upon successfully establishing the connection with the terminal, facilitating reading of the health status of the payment card; and
   displaying the health status of the payment card on the terminal for the cardholder.

3. The payment card as claimed in claim 1, further comprising:
   a damage sensor configured to sense the physical damage in the interconnection circuit and to generate the damage signal.

4. The payment card as claimed in claim 3, wherein the payment card processing section is one of a magnetic stripe or an EMV chip comprising a payment card information.

5. The payment card as claimed in claim 3, wherein the display section comprises a plurality of color filters configured to display a color in response to the damage signal.

6. The payment card as claimed in claim 5, wherein the electronic circuit is in operative communication with the damage sensor, the electronic circuit configured to compare the damage signal with at least one threshold for determining the health status of the payment card.

7. The payment card as claimed in claim 6, wherein the health status is at least one of:
   a good health condition;
   a deteriorating health condition; and
   a bad health condition.

8. The payment card as claimed in claim 7, wherein the payment card processing section is further configured to perform:
 receiving the health status of the payment card from the electronic circuit; and
 storing the health status of the payment card.

9. The payment card as claimed in claim 8, wherein upon receipt of the transaction request from the payment card processing section, the server system is further configured to perform:
 determining if the payment card is at least one of a valid payment card or an invalid payment card based on the validity information;
 upon determining the payment card as the invalid payment card, accessing the health status of the payment card;
 upon determining the good health condition of the payment card, updating the validity information of the payment card; and
 sending a validity extension information to the payment card for updating the validity information of the payment card.

10. The payment card as claimed in claim 6, wherein the interconnection circuit comprises a plurality of interconnection circuits configured in a plurality of portions of the payment card, wherein each portion has a different priority score used for determining the health status of the payment card.

11. The payment card as claimed in claim 1, wherein upon receipt of the transaction request, the server system is further configured to perform:
 accessing historical data of the payment card for determining usage characteristics of the payment card; and
 processing a new payment card request for the cardholder based on the historical data.

12. A method, comprising:
 receiving, by an electronic circuit, a damage signal in response to a physical damage of at least a portion of a planar body of a payment card or a payment card processing section housed therewith;
 determining, by the electronic circuit, a health status of the payment card based on the damage signal;
 facilitating, by the electronic circuit, display of a visual information indicating the health status of the payment card for a cardholder on a display section positioned in the planar body; and
 sending, by the payment card processing section, a transaction request to a server system associated with a payment network via a terminal, the transaction request comprising at least a payment card information, the health status of the payment card and a validity information, wherein upon receipt of the transaction request, the server system is configured to perform:
  reading the health status of the payment card; and
  upon determining the health status as at least one of a deteriorating health condition or a bad health condition, processing a new payment card request for the cardholder.

13. The method as claimed in claim 12, further comprising:
 sensing, by a damage sensor, the physical damage in an interconnection circuit for generating the damage signal.

14. The method as claimed in claim 13, wherein facilitating the display of the visual information comprises:
 displaying, by the display section, a color in response to the damage signal, the color being generated by a plurality of color filters.

15. The method as claimed in claim 12, wherein the payment card processing section is further configured to perform:
 establishing a connection with the terminal for performing a transaction;
 upon successfully establishing the connection with the terminal, facilitating reading of the health status of the payment card; and
 displaying the health status of the payment card on the terminal for the cardholder.

16. A payment card, comprising:
 a planar body housing a payment card processing section, the payment card processing section being embodied in at least one portion of one or more portions of the planar body;
 a plurality of interconnection circuits configured within the planar body for detecting a physical damage in at least a portion of the planar body, each interconnection circuit of the plurality of interconnection circuits configured in one portion of the one or more portions;
 a damage sensor configured to sense the physical damage in at least one interconnection circuit of the plurality of interconnection circuits for generating a damage signal;
 an electronic circuit configured to receive the damage signal and determine a health status of the payment card; and
 a display section positioned in the planar body for displaying a visual information indicating the health status of the payment card for a cardholder;
 wherein the payment card processing section is configured to send a transaction request to a server system associated with a payment network via a terminal, the transaction request comprising at least a payment card information, the health status of the payment card and a validity information, wherein upon receipt of the transaction request, the server system is configured to perform:
  reading the health status of the payment card; and
  upon determining the health status as at least one of a deteriorating health condition or a bad health condition, processing a new payment card request for the cardholder.

17. The payment card as claimed in claim 16, wherein the display section comprises a plurality of color filters configured to display a color in response to the damage signal.

18. The payment card as claimed in claim 17, wherein for generating the damage signal, the damage sensor is configured to perform:
 generating an error vector based on the at least one interconnection circuit sensing the physical damage in the payment card; and
 determining the damage signal based on the error vector and a priority score associated with the at least one interconnection circuit.

* * * * *